United States Patent
Nesbit et al.

(10) Patent No.: US 9,058,122 B1
(45) Date of Patent: Jun. 16, 2015

(54) CONTROLLING ACCESS IN A SINGLE-SIDED DISTRIBUTED STORAGE SYSTEM

(75) Inventors: Kyle Nesbit, Madison, WI (US); Manoj Kasichainula, Mountain View, CA (US)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 13/599,356

(22) Filed: Aug. 30, 2012

(51) Int. Cl.
*G06F 17/30* (2006.01)
*G06F 3/06* (2006.01)

(52) U.S. Cl.
CPC .............. *G06F 3/0659* (2013.01); *G06F 3/064* (2013.01)

(58) Field of Classification Search
USPC ........................................................ 709/212
See application file for complete search history.

(56) References Cited

U.S. PATENT DOCUMENTS

| | | | |
|---|---|---|---|
| 5,857,190 A | 1/1999 | Brown | |
| 6,026,414 A | 2/2000 | Anglin | |
| 6,219,693 B1 | 4/2001 | Napolitano et al. | |
| 6,260,069 B1 | 7/2001 | Anglin | |
| 6,301,605 B1 | 10/2001 | Napolitano et al. | |
| 6,721,806 B2 | 4/2004 | Boyd et al. | |
| 7,418,487 B2 | 8/2008 | Andreas | |
| 7,475,207 B2 | 1/2009 | Bromling et al. | |
| 7,487,153 B2 | 2/2009 | Makhervaks et al. | |
| 7,554,976 B2 | 6/2009 | Feng et al. | |
| 7,565,454 B2 | 7/2009 | Zuberi | |
| 7,725,535 B2 | 5/2010 | Koonce et al. | |
| 7,761,619 B2 | 7/2010 | Feng et al. | |
| 7,827,350 B1 | 11/2010 | Jiang et al. | |
| 7,934,055 B2 | 4/2011 | Flynn et al. | |
| 8,006,065 B2 | 8/2011 | Bestler | |
| 8,019,940 B2 | 9/2011 | Flynn et al. | |
| 8,090,790 B2 | 1/2012 | Bestler | |
| 8,095,730 B1 | 1/2012 | Jiang et al. | |
| 8,122,155 B1 | 2/2012 | Marti | |
| 8,224,777 B2 | 7/2012 | Kimmel | |
| 8,325,633 B2 | 12/2012 | Archer et al. | |
| 8,468,521 B2 | 6/2013 | Pawlowski | |
| 2003/0149750 A1 | 8/2003 | Franzenburg | |
| 2004/0049774 A1 | 3/2004 | Boyd et al. | |
| 2004/0073622 A1 | 4/2004 | McDaniel et al. | |
| 2004/0111498 A1 | 6/2004 | Andreas | |

(Continued)

FOREIGN PATENT DOCUMENTS

| | | |
|---|---|---|
| EP | 1498822 A2 | 1/2005 |
| EP | 1543422 A1 | 6/2005 |

(Continued)

*Primary Examiner* — Tu Nguyen
(74) *Attorney, Agent, or Firm* — Honigman Miller Schwartz and Cohn LLP

(57) ABSTRACT

A distributed storage system that includes memory hosts having non-transitory memory storing data chunks of files. Each data chunk is associated with an access control list. Each memory host also includes a network interface controller in communication with the memory for servicing remote direct memory access requests and a computing processor in communication with the memory and the network interface controller. The computing processor executes a host process that registers a set of remote direct memory accessible regions of the memory storing data chunks with the network interface controller. In response to receiving a connection request from a client process of a client to access a data chunk, the host process establishes a remote direct memory access capable connection with the client process when both the client and the data chunk are associated with the same access control list.

31 Claims, 17 Drawing Sheets

(56) References Cited

U.S. PATENT DOCUMENTS

| | | |
|---|---|---|
| 2004/0225719 A1* | 11/2004 | Kisley et al. .................. 709/212 |
| 2005/0015469 A1 | 1/2005 | Zuberi |
| 2005/0129045 A1 | 6/2005 | Machulsky et al. |
| 2005/0198062 A1 | 9/2005 | Shapiro |
| 2005/0213608 A1 | 9/2005 | Modi et al. |
| 2006/0165084 A1 | 7/2006 | Makhervaks et al. |
| 2006/0168091 A1 | 7/2006 | Makhervaks et al. |
| 2006/0256784 A1 | 11/2006 | Feng et al. |
| 2006/0259570 A1 | 11/2006 | Feng et al. |
| 2008/0140932 A1 | 6/2008 | Flynn et al. |
| 2008/0235746 A1 | 9/2008 | Peters et al. |
| 2008/0256183 A1 | 10/2008 | Flynn et al. |
| 2008/0256292 A1 | 10/2008 | Flynn et al. |
| 2008/0313364 A1 | 12/2008 | Flynn et al. |
| 2009/0100163 A1 | 4/2009 | Tsao et al. |
| 2010/0017802 A1 | 1/2010 | Lojewski |
| 2010/0083247 A1 | 4/2010 | Kanevsky et al. |
| 2011/0066824 A1 | 3/2011 | Bestler |
| 2011/0093740 A1 | 4/2011 | Tsao et al. |
| 2011/0179225 A1 | 7/2011 | Flynn et al. |
| 2011/0296277 A1 | 12/2011 | Flynn et al. |
| 2012/0011176 A1 | 1/2012 | Aizman |
| 2012/0066407 A1 | 3/2012 | Andries et al. |
| 2012/0072607 A1 | 3/2012 | Kawashima et al. |
| 2012/0117610 A1 | 5/2012 | Pandya |
| 2012/0221803 A1* | 8/2012 | Stabrawa et al. ............. 711/154 |
| 2013/0086269 A1 | 4/2013 | Bairavasundaram et al. |
| 2013/0086324 A1 | 4/2013 | Soundararajan et al. |

FOREIGN PATENT DOCUMENTS

| | | |
|---|---|---|
| EP | 1552409 A1 | 7/2005 |
| EP | 1839162 A1 | 10/2007 |
| JP | 04012545 | 1/1992 |
| JP | 2011222011 A | 11/2011 |
| WO | WO-2004017220 A1 | 2/2004 |
| WO | WO-2004023305 A1 | 3/2004 |
| WO | WO-2006076993 A1 | 7/2006 |
| WO | WO-2006124718 A2 | 11/2006 |
| WO | WO-2008070172 A2 | 6/2008 |
| WO | WO-2012061255 A2 | 5/2012 |

* cited by examiner

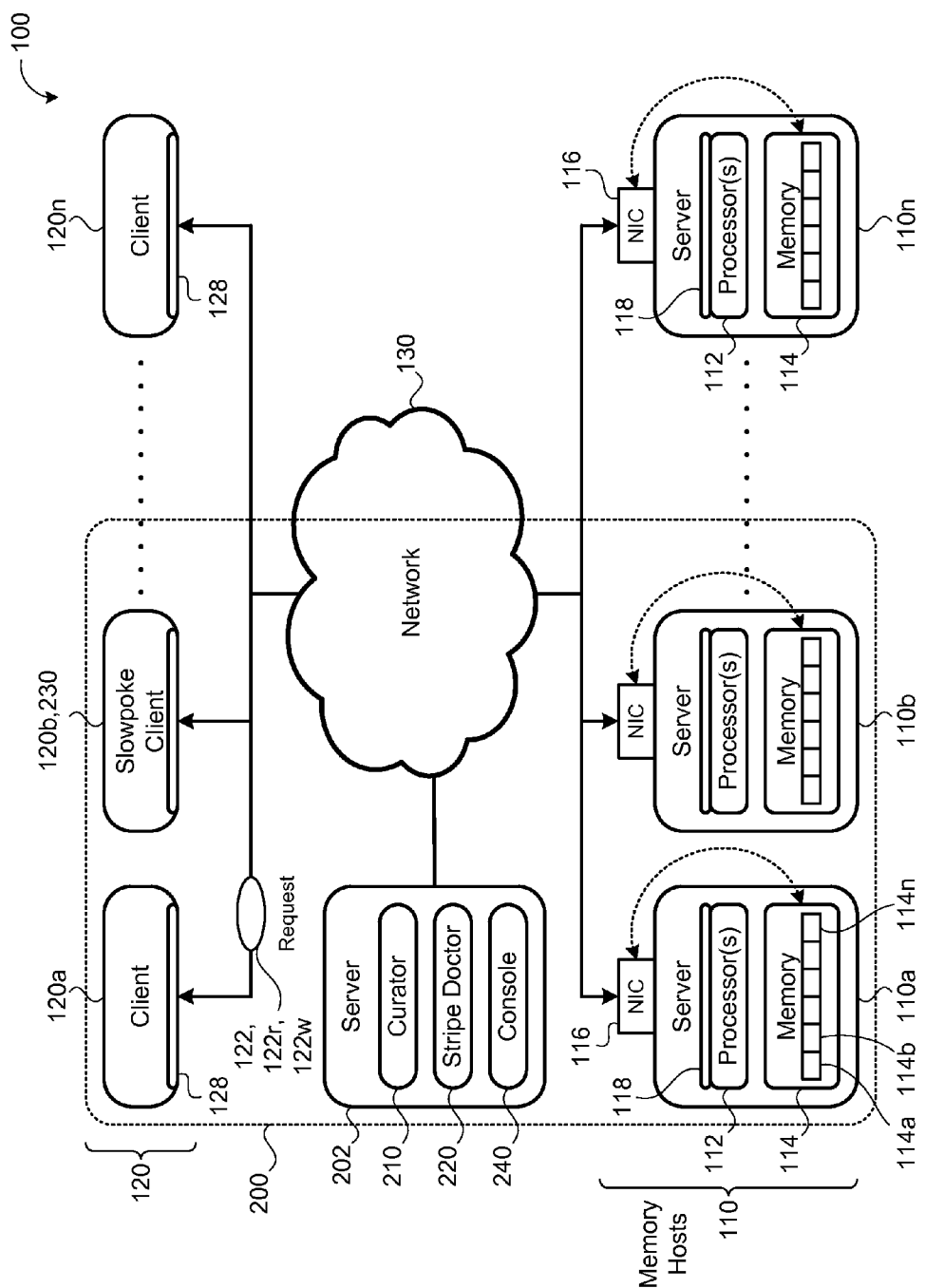

CONTROLLING ACCESS IN A SINGLE-SIDED DISTRIBUTED STORAGE SYSTEM

TECHNICAL FIELD

This disclosure relates to controlling access in distributed storage systems.

BACKGROUND

A distributed system generally includes many loosely coupled computers, each of which typically include a computing resource (e.g., processor(s)) and storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes.

A remote procedure call is a two-sided software operation initiated by client software executing on a first machine and serviced by server software executing on a second machine. Servicing storage system requests (e.g., read data) in software may require an available processor, which may place a significant limitation on a distributed storage system. In the case of a distributed storage system, this means a client process cannot access a remote computer's storage resources unless the remote computer has an available processor to service the client's request. Moreover, the demand for processor resources and storage resources in a distributed system often do not match. In particular, computing resource (i.e., processors) may have heavy and/or unpredictable usage patterns, while storage resources may have light and very predictable usage patterns. When a server's processor(s) are heavily utilized, there may be no processors available to service a storage request when it arrives. In this case, the storage request waits for completion of other software tasks executed by the processor(s) or preemption by a kernel before the storage request can be serviced by a processor, even though there may be plenty of storage bandwidth to service the request immediately. Alternatively, one or more dedicated processors could service such storage requests, at the expense of efficiency and decreased processing capacity for nominal processing tasks.

Generally, coupling processor and storage resources can result in high and/or unpredictable latency, especially if the distributed system's processor resources are heavily utilized.

SUMMARY

One aspect of the disclosure provides a distributed storage system that includes memory hosts having non-transitory memory storing data chunks of files. Each data chunk is associated with an access control list. Each memory host also includes a network interface controller in communication with the memory for servicing remote direct memory access requests and a computing processor in communication with the memory and the network interface controller. The computing processor executes a host process that registers a set of remote direct memory accessible regions of the memory storing data chunks with the network interface controller. In response to receiving a connection request from a client process of a client to access a data chunk, the host process establishes a remote direct memory access capable connection with the client process when both the client and the data chunk are associated with the same access control list.

Implementations of the disclosure may include one or more of the following features. In some implementations, the host process associates the established connection with a protection domain having associated memory regions. The connection is capable of accessing only the memory regions associated with its protection domain. The network interface controller of the memory host executes a connection handshake with a network interface controller of the client process to establish the remote direct memory access capable connection between the host process and the client process. The connection handshake may evaluate an identity of the host and client processes. After the connection is established, the local process and remote process can each unilaterally break the connection therebetween. In some examples, the network interface controllers may tear down the connection when the remote direct memory access request includes an address for unregistered memory.

In some implementations, the host process registers the remote direct memory accessible regions of memory with a permission of read-only or read/write. Moreover, the access control list may provide an access permission for each associated client or each associated data chunk.

The distributed storage system may include a curator in communication with the memory hosts. The curator allocates memory for the data chunks and associates the allocated memory of each data chunk with a protection domain. The protection domain is capable of being associated with one or more connections. In response to a memory access request from a client in communication with the memory hosts and the curator, the curator may return a file descriptor to the client that maps data chunks of a file on the memory hosts for remote direct memory access of the data chunks on the memory hosts. The file descriptor may include a client key for each data chunk of the file. Each client key allows access to the corresponding data chunk on its memory host. The network interface controller of each memory host may create a client key for each registered memory region.

A method of controlling access in a distributed storage system includes receiving an access control list that has at least one associated client and at least one associated data chunk, receiving a connection request from a client to access a data chunk stored in non-transitory memory of a memory host, and establishing a remote direct memory access capable connection with the client when both the client and the requested data chunk are associated with the same access control list.

In some implementations, the method includes associating the established connection with a protection domain having an associated memory region storing the data chunk. The connection is capable of accessing only memory regions associated with its protection domain. Moreover, the protection domain is capable of being associated with one or more connections. The method may include allocating memory for the data chunk (e.g., via the curator) and associating the allocated memory with the protection domain and/or associating the data chunk with the access control list. The method may include assigning an access permission for each client or each data chunk associated with the access control list.

The method may include executing a connection handshake with the client to establish the remote direct memory access capable connection. In some examples, the method includes evaluating an identity of the client, such as by executing a client authentication routine. If a received remote direct memory access request includes an address for unregistered memory, the method may include tearing down the connection.

The method may include registering remote direct memory accessible regions of memory with a network interface controller of the memory host. The remote direct memory accessible memory regions may be registered with a permission of read-only or read/write.

In response to receiving a memory access request from the client, the method may include returning a file descriptor that maps data chunks of the file on memory hosts for remote direct memory access of the data chunks on the memory hosts. The file descriptor may include a client key for each data chunk of the file. Moreover, each client key allows access to the corresponding data chunk on its memory host.

A method of accessing data stored on a distributed storage system includes instantiating a memory access request for a data chunk stored in non-transitory memory of a memory host of the distributed storage system and searching a connection cache for an open remote direct memory access capable connection to the memory host that is associated with a protection domain of the memory storing the requested data chunk. If the connection cache fails to contain the open connection, the method includes sending a connection request to the memory host. The memory host establishes the remote direct memory access capable connection when both a client instantiating the connection request and the requested data chunk are associated with the same access control list. The connection request may include the access control list. The method includes sending the memory access request to the memory host over the open connection and optionally storing the open connection in a connection cache. The method may include executing a connection handshake with a network interface controller of the memory host to establish the remote direct memory access capable connection.

The method may include receiving a file descriptor mapping data chunk to the memory hosts. The file descriptor may include a client key allowing access to the corresponding data chunk on its memory host. The method may include sending a memory access request for multiple data chunks stored in the memory of the memory host, two or more of the data chunks associated with different access control lists.

A computer program product encoded on a non-transitory computer readable storage medium comprising instructions that when executed by a data processing apparatus cause the data processing apparatus to perform operations of a method of controlling access in a distributed storage system. The method includes receiving an access control list that has at least one associated client and at least one associated data chunk, receiving a connection request from a client to access a data chunk stored in non-transitory memory of a memory host, and establishing a remote direct memory access capable connection with the client when both the client and the requested data chunk are associated with the same access control list.

In some implementations, the method includes associating the established connection with a protection domain having an associated memory region storing the data chunk. The connection is capable of accessing only memory regions associated with its protection domain. Moreover, the protection domain is capable of being associated with one or more connections. The method may include allocating memory for the data chunk (e.g., via the curator) and associating the allocated memory with the protection domain and/or associating the data chunk with the access control list. The method may include assigning an access permission for each client or each data chunk associated with the access control list.

The method may include executing a connection handshake with the client to establish the remote direct memory access capable connection. In some examples, the method includes evaluating an identity of the client, such as by executing a client authentication routine. If a received remote direct memory access request includes an address for unregistered memory, the method may include tearing down the connection.

The method may include registering remote direct memory accessible regions of memory with a network interface controller of the memory host. The remote direct memory accessible memory regions may be registered with a permission of read-only or read/write.

In response to receiving a memory access request from the client, the method may include returning a file descriptor that maps data chunks of the file on memory hosts for remote direct memory access of the data chunks on the memory hosts. The file descriptor may include a client key for each data chunk of the file. Moreover, each client key allows access to the corresponding data chunk on its memory host.

A computer program product encoded on a non-transitory computer readable storage medium comprising instructions that when executed by a data processing apparatus cause the data processing apparatus to perform operations of a method of accessing data stored on a distributed storage system. The method includes instantiating a memory access request for a data chunk stored in non-transitory memory of a memory host of the distributed storage system and searching a connection cache for an open remote direct memory access capable connection to the memory host that is associated with a protection domain of the memory storing the requested data chunk. If the connection cache fails to contain the open connection, the method includes sending a connection request to the memory host. The memory host establishes the remote direct memory access capable connection when both a client instantiating the connection request and the requested data chunk are associated with the same access control list. The connection request may include the access control list. The method includes sending the memory access request to the memory host over the open connection and optionally storing the open connection in a connection cache. The method may include executing a connection handshake with a network interface controller of the memory host to establish the remote direct memory access capable connection.

The method may include receiving a file descriptor mapping data chunk to the memory hosts. The file descriptor may include a client key allowing access to the corresponding data chunk on its memory host. The method may include sending a memory access request for multiple data chunks stored in the memory of the memory host, two or more of the data chunks associated with different access control lists.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2A is a schematic view of an exemplary distributed storage system having a cell of memory hosts managed by a curator.

Like reference symbols in the various drawings indicate like elements.

DETAILED DESCRIPTION

Figure 1:
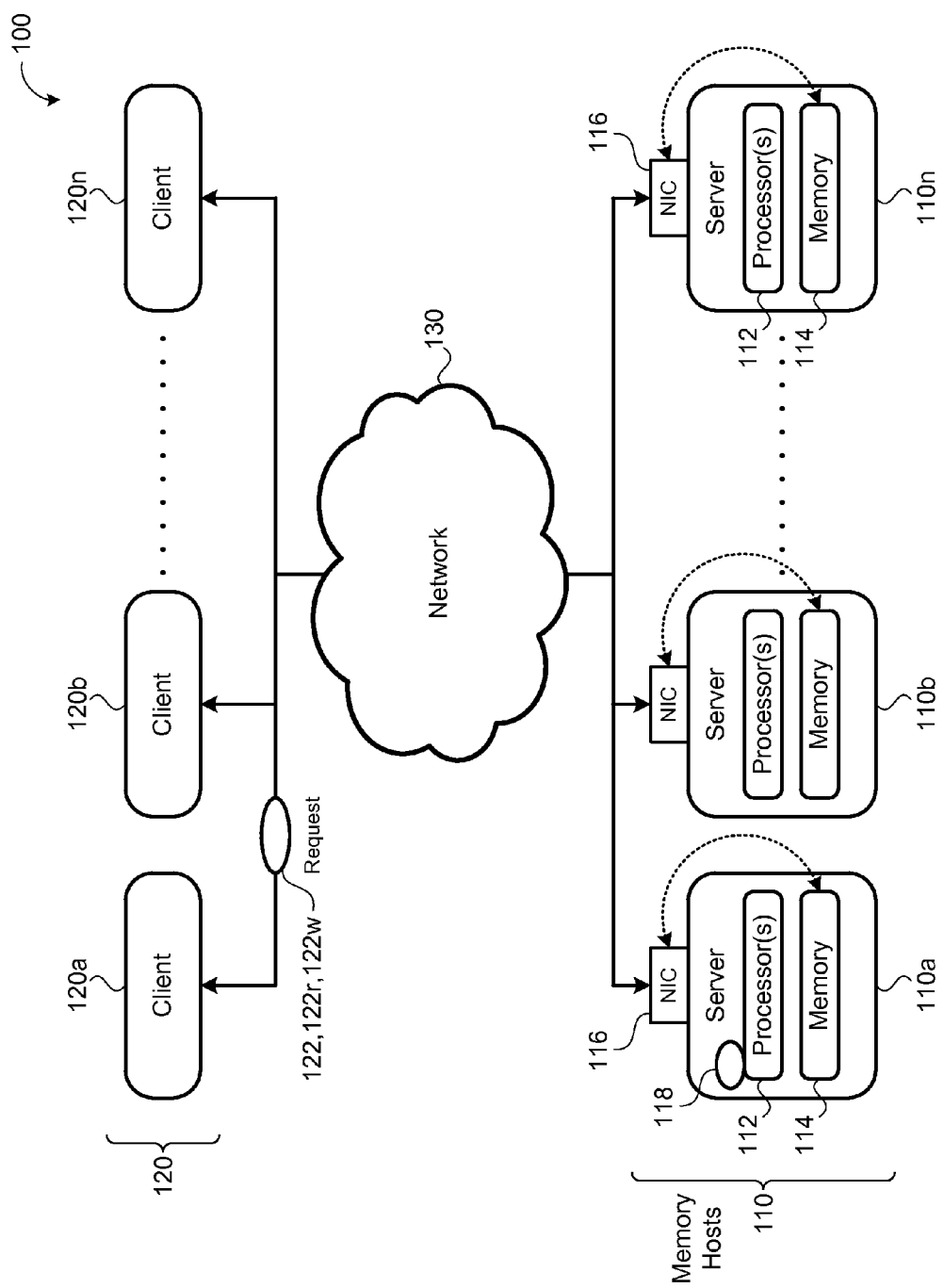
FIG. 1 is a schematic view of an exemplary distributed storage system.

Referring to FIG. 1, in some implementations, a distributed storage system 100 includes loosely coupled memory hosts 110, 110a-n (e.g., computers or servers), each having a computing resource 112 (e.g., one or more processors) in communication with storage resources 114 (e.g., memory, flash memory, dynamic random access memory (DRAM), phase change memory (PCM), and/or disks). A storage abstraction (e.g., key/value store or file system) overlain on the storage resources 114 allows scalable use of the storage resources 114 by one or more clients 120, 120a-n. The clients 120 may communicate with the memory hosts 110 through a network 130. Rather than having a processor 112 of a memory host 110 (e.g., a server) execute a server process that exports access of the corresponding storage resource 114 (e.g., non-transitory memory) to client processes executing on the clients 120, the clients 120 may directly access the storage resource 114 through a network interface controller (NIC) 116 of the memory host 110. In other words, a client process executing on a client 120 may directly interface with one or more storage resources 114 without requiring execution of a routine of any server processes executing on the computing resources 112. This offers a single-sided distributed storage architecture that offers relatively high-throughput and low latency, since clients 120 can access the storage resources 114 without interfacing with the computing resources 112 of the memory hosts 110.

A network interface controller 116 (also known as a network interface card, network adapter, or LAN adapter) may be a computer hardware component that connects a computing resource 112 to the network 130. The network controller 116 implements communication circuitry using a specific physical layer (OSI layer 1) and data link layer (layer 2) standard, such as Ethernet, Wi-Fi, or Token Ring. This provides a base for a full network protocol stack, allowing communication among small groups of computers on the same LAN and large-scale network communications through routable protocols, such as Internet Protocol (IP). Both the memory hosts 110a-n and the client 120 may each have a network interface controller 116 for network communications. A host process 118 executing on the computing processor 112 of the memory host 110 registers a set of remote direct memory accessible regions 114a-n of the memory 114 with the network interface controller 116. The host process 118 may register the remote direct memory accessible regions 114a-n of the memory 114 with a permission of read-only or read/write. The network interface controller 216 of the memory host 110 creates a client key 321 for each registered memory region 114a-n.

In some implementations, the network 130 is an InfiniBand network, which is a switched fabric communications link generally used in high-performance computing and enterprise data centers. It features high throughput, low latency, quality of service, failover, and scalability. The InfiniBand architecture specification defines a connection between processor nodes and high performance I/O nodes such as storage devices. The InfiniBand network 130 conveys remote direct memory access (RDMA) requests 122 from a client 120 to a memory host 110. At the memory host 110, an RDMA-capable InfiniBand network interface controller (NIC) 116 performs reads and writes of the storage resource 114 (e.g., DRAM). RDMA uses zero-copy, OS-bypass to provide high throughput, low latency access to data (e.g., 4 GB/s of bandwidth and 5 microsecond latency). The distributed storage system 100 may use RDMA, remote procedure calls, or other data access methods to access data.

Figure 2B:
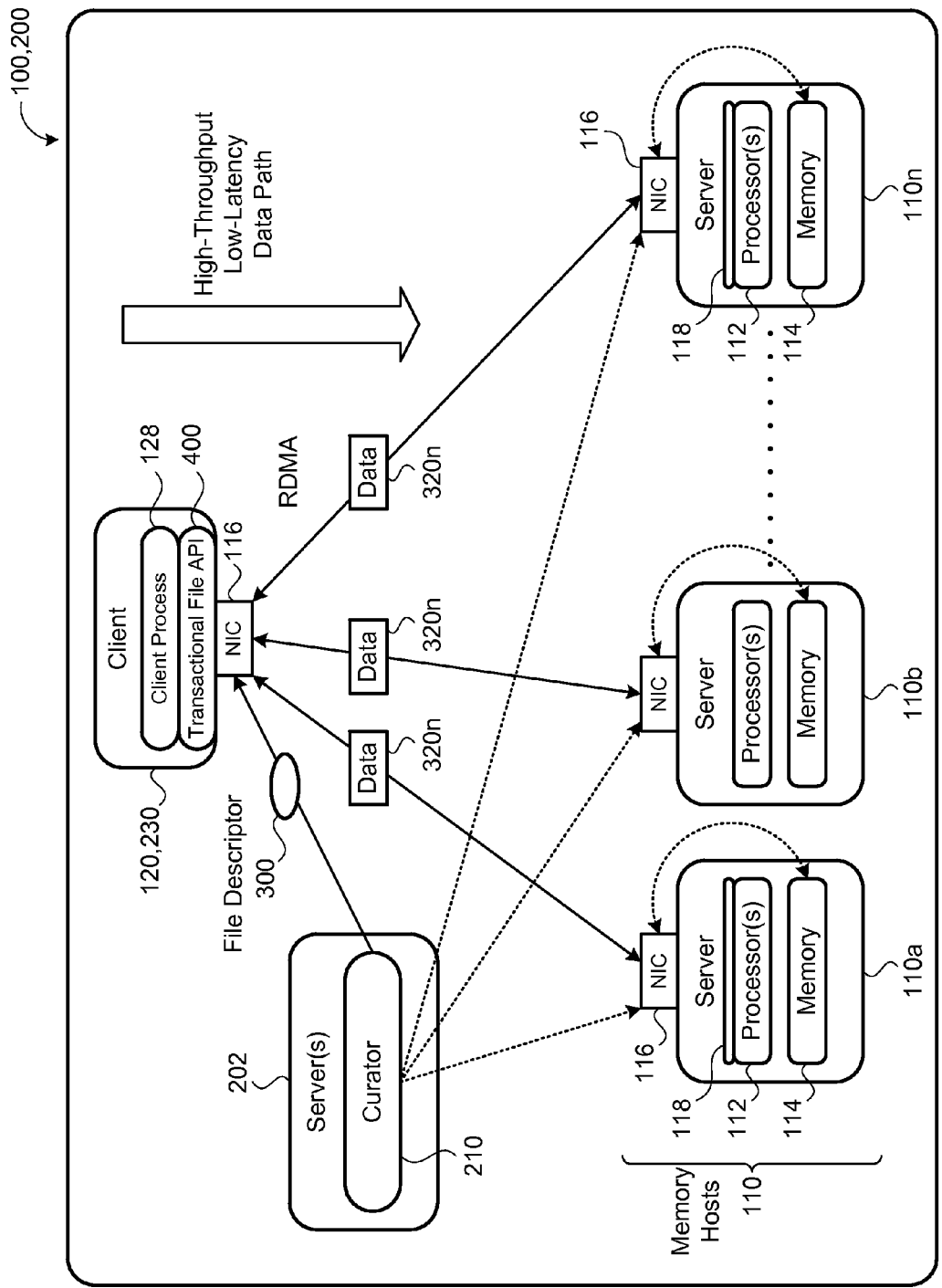
FIG. 2B is a schematic view of an exemplary cell of a distributed storage system.

Referring to FIGS. 2A and 2B, in some implementations, the distributed storage system 100 includes multiple cells 200, each cell 200 including memory hosts 110 and a curator 210 in communication with the memory hosts 110. Each cell 200 may also include one or more stripe doctors 220 (e.g., processes for managing and/or repairing stripes), one or more slowpoke clients 230 (e.g., clients or virtual clients used for assessing system performance), and a console 240 for monitoring and managing the cell 200.

The curator 210 (e.g., process) may execute on a computing processor 202 (e.g., server) connected to the network 130 and manages the data storage (e.g., manages a file system stored on the memory hosts 110), controls data placements, and/or initiates data recovery. Moreover, the curator 210 may track an existence and storage location of data on the memory hosts 110. Redundant curators 210 are possible. In some implementations, the curator(s) 210 track the striping of data across multiple memory hosts 110 and the existence and/or location of multiple copies of a given stripe for redundancy and/or performance. In computer data storage, data striping is the technique of segmenting logically sequential data, such as a file, in a way that accesses of sequential segments are made to different physical storage devices (e.g., cells 200 and/or memory hosts 110). Striping is useful when a processing device requests access to data more quickly than a storage device can provide access. By performing segment accesses on multiple devices, multiple segments can be accessed concurrently. This provides more data access throughput, which avoids causing the processor to idly wait for data accesses.

In some implementations, an application programming interface (API) 400 interfaces between a client 120 (e.g., a client process 128) and the curator 210. In some examples, the client 120 communicates with the curator 210 through one or more remote procedure calls (RPC). In response to a client request 122, the API 400 may find the storage location of certain data on memory host(s) 110, and obtain a key 321 that allows access to the data. The API 400 communicates directly with the appropriate memory hosts 110 (via the network interface controllers 216) to read or write the data (e.g., using remote direct memory access). In the case that a memory host 110 is non-operational, or the data was moved to a different memory host 110, the client request 122 fails, prompting the client 120 to re-query the curator 210.

Figure 2C:
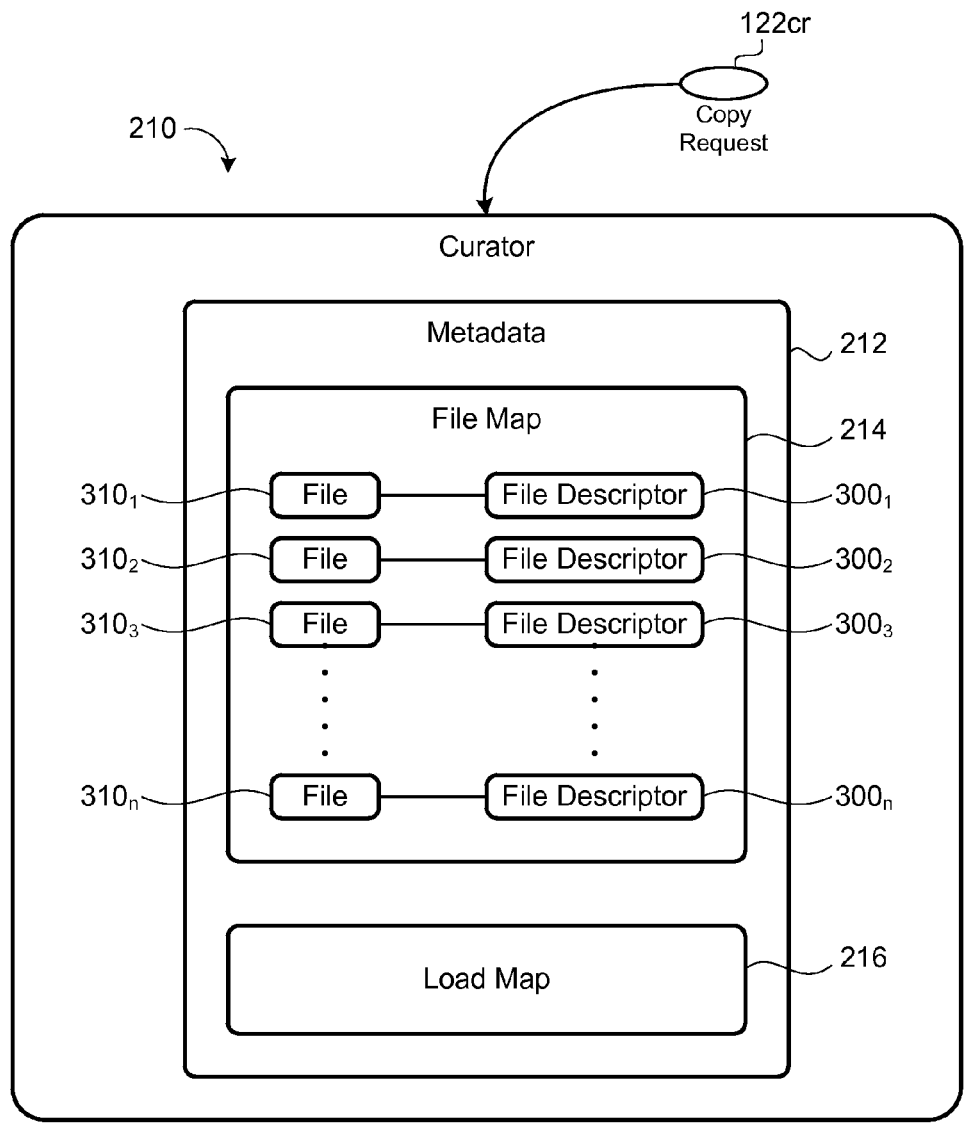
FIG. 2C is a schematic view of an exemplary curator for a distributed storage system.

Referring to FIG. 2C, in some implementations, the curator 210 stores and manages file system metadata 212. The metadata 212 includes a file map 214 that maps files $310_{1-n}$ to file descriptors $300_{1-n}$. The curator 210 may examine and modify the representation of its persistent metadata 212. The curator 210 may use three different access patterns for the metadata 212: read-only, file transactions, and stripe transactions. Read-only access allows the curator 210 to examine a state of the metadata 212 with minimal contention. A read-only request returns the most recent state of a file 310, but with no synchronization with concurrent updates. The read-only access may be used to respond to lookup requests from clients 120 (e.g., for internal operations, such as file scanning).

Figure 3A:
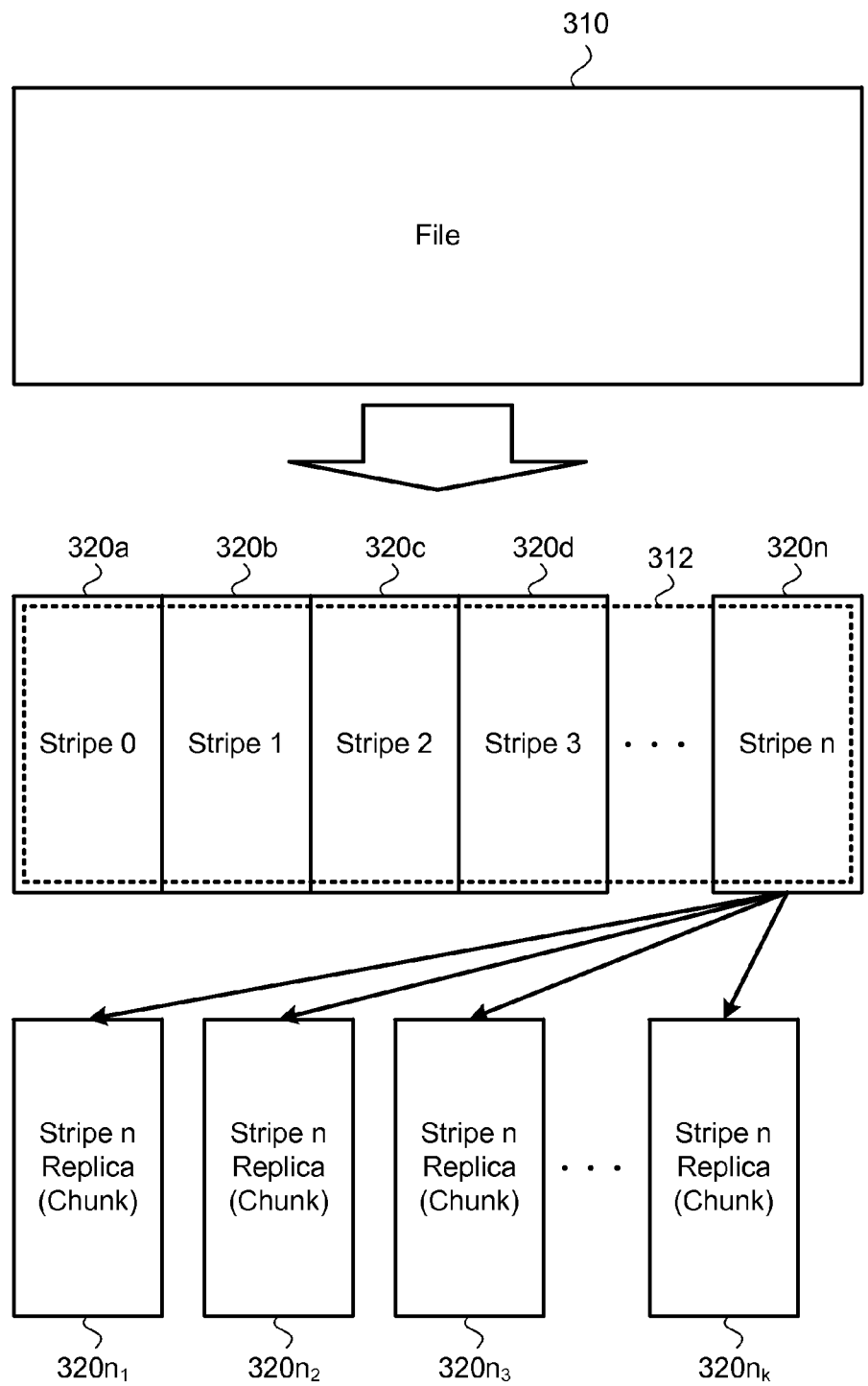
FIG. 3A is a schematic view of an exemplary file split into replicated stripes.
Figure 3B:
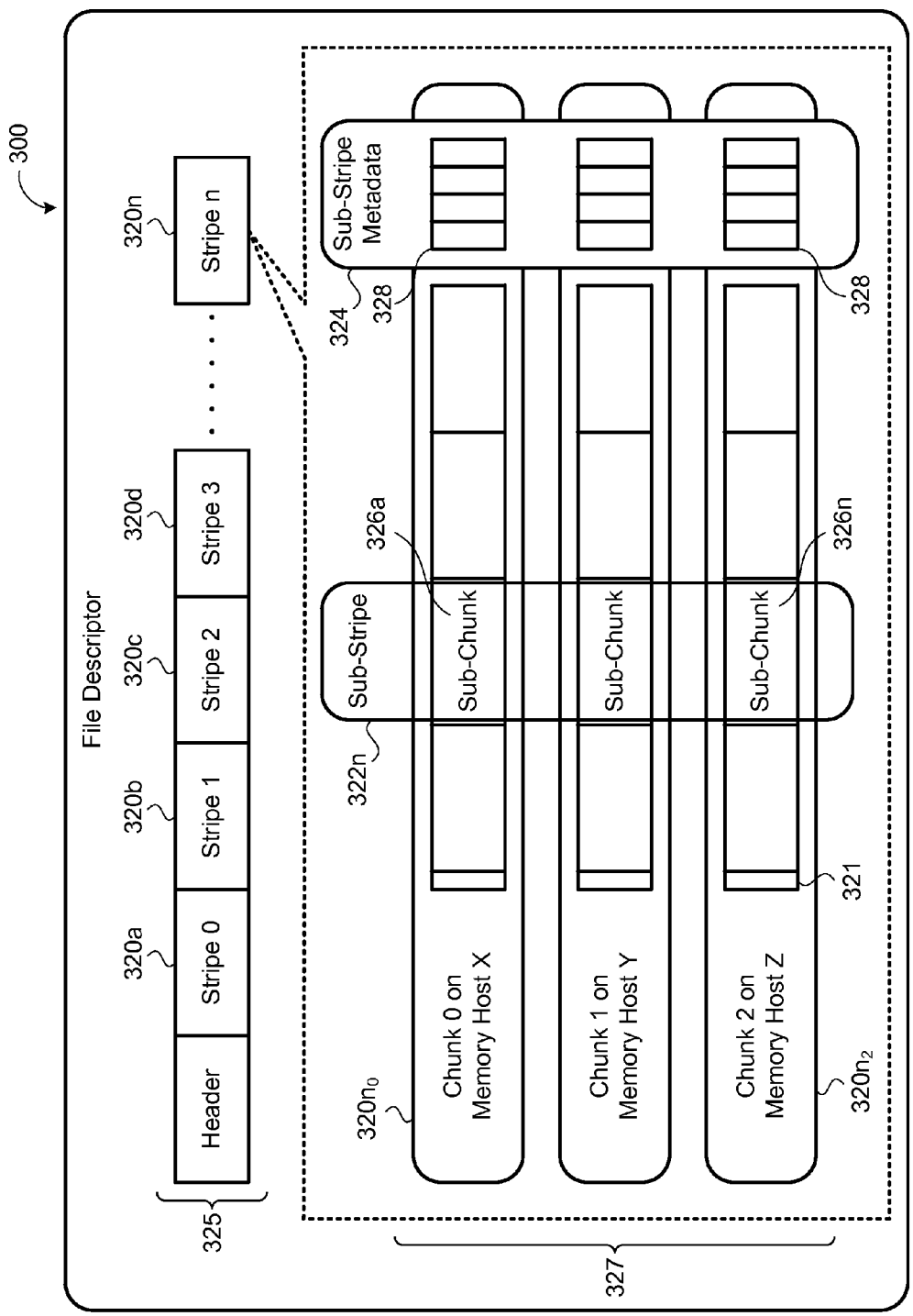
FIG. 3B is a schematic view of an exemplary file descriptor.

Referring also to FIGS. 3A and 3B, in some implementations, the memory hosts 110 store file data 312. The curator 210 may divide each file 310 (and its data 312) into stripes 320a-n and replicate the stripes 320a-n for storage in multiple storage locations. A stripe replica $320n_k$ is also referred to as a chunk or data chunk $320n_k$. Mutable files may have additional metadata stored on the memory host(s) 110, such as lock words and version numbers. The lock words and versions numbers may be used to implement a distributed transaction commit protocol.

File descriptors 300 stored by the curator 210 contain metadata, such as the file map 214, that maps the stripes 320a-n to data chunks $320n_k$ (i.e., stripe replicas) stored on the memory hosts 110. To open a file 310, a client 120 sends a request 122 to the curator 210, which returns the file descriptor 300. The client 120 uses the file descriptor 300 to translate file chunk offsets to remote memory locations 114a-n. After the client 120 loads the file descriptor 300, the client 120 may access the file's data via RDMA or another data retrieval method.

Figure 2D:
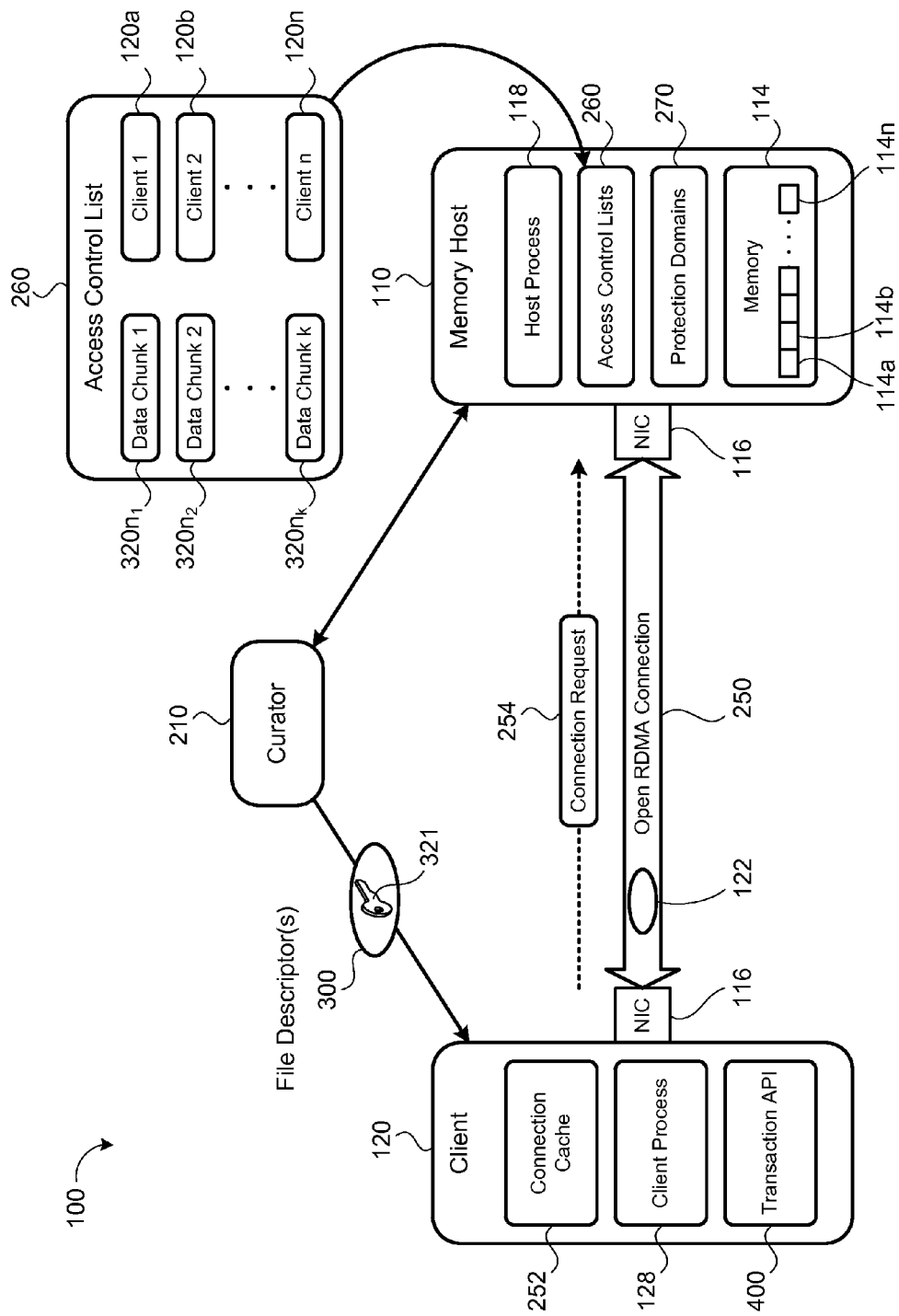
FIG. 2D is a schematic view of establishing a connection between a client and memory host of an exemplary distributed storage system.
Figure 2E:
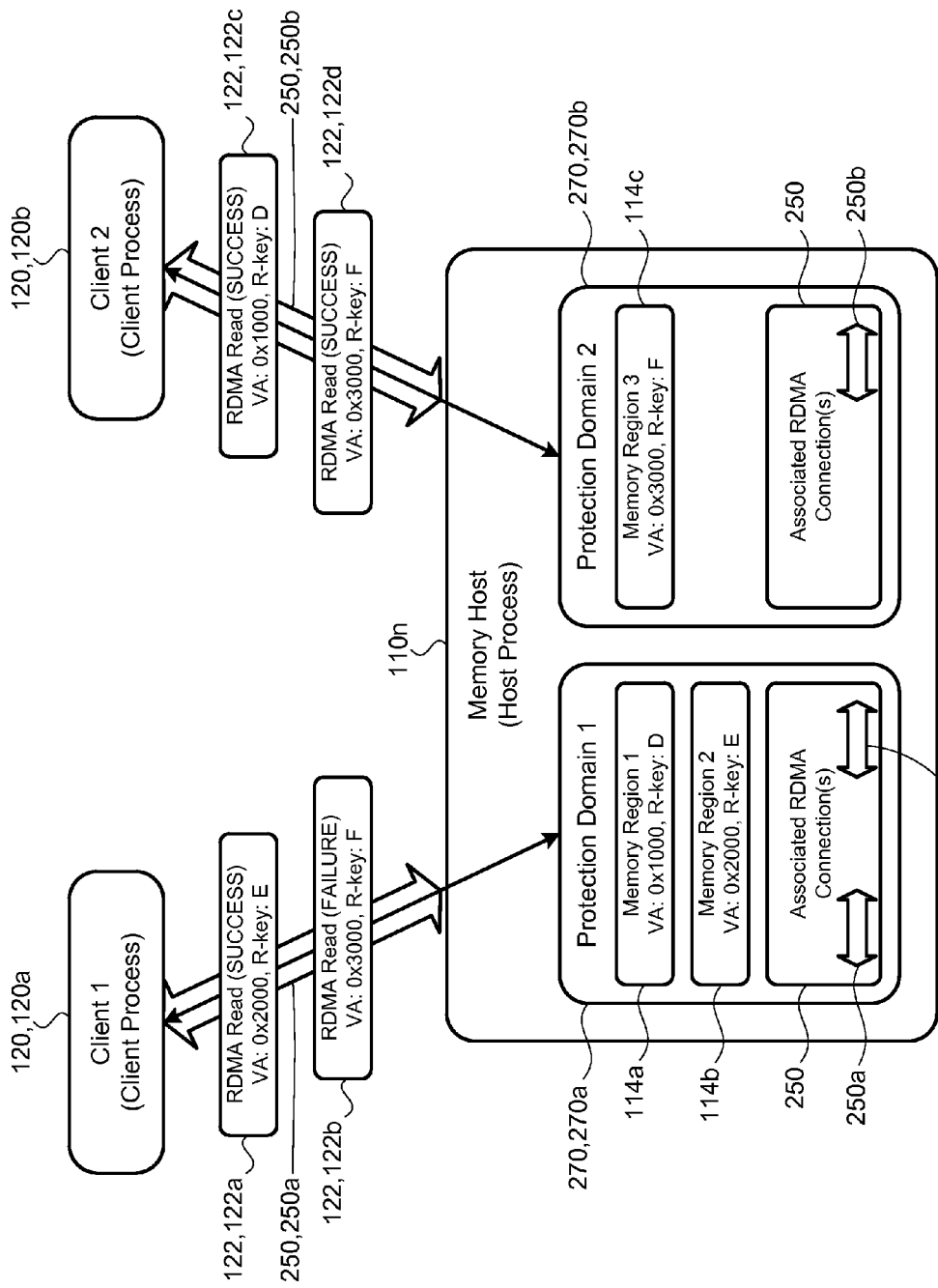
FIG. 2E is a schematic view of clients sending memory access requests to a memory host of an exemplary distributed storage system.

Referring to FIGS. 2D and 2E, RDMA is a connection-based process-to-process communication mechanism, so RDMA connections typically do not support authentication or encryption by themselves. As a result, the distributed storage system 100 may treat the RDMA connections 250 as secure resources. In order for a client process 128 to access the memory 114 of a host process 118 through RDMA, the network interface controller 116 of the memory host 110 executes a connection handshake with a network interface controller 116 of the client process 128 to establish the RDMA capable connection 250 between the host process 118 and the client process 128. The RDMA connection handshake may implement a higher-level secure protocol that evaluates the identities of the host and client processes 118, 128 as known at the time of creation of the trusted RDMA connection 250. After an RDMA-capable connection 250 is established, the client process 128 or the host process 118 can unilaterally break the connection 250. If either the client process 128 or the host process 118 dies, the client 120 and/or the memory host 110 (via operating systems) can tear down the corresponding RDMA connection(s) 250.

Access to file data 312 (e.g., data chunks $320n_k$) stored in remote memory locations 114a-n may be controlled by access control lists 260. Each access control list 260 may have a unique name, a list of data chunks $320n_k$, and a list of clients 120a-n that have permission to read and write the data chunks $320n_k$ associated with that access control list 260. In some examples, the access control list 260 provides an access permission level for each associated client 120 or each associated data chunk $320n_k$. The memory hosts 110 may receive the access control lists 260 through a secure communication channel and can be enforced by the memory hosts 110 using protection domains 270. Each RDMA accessible memory region 114a-n registered with the network interface controller 116 of each memory host 110 is associated with a protection domain 270. In some implementations, when the curator 210 allocates memory 114 for the data chunks $320n_k$, it associates the allocated memory regions 114a-n of the data chunks $320n_k$ with one or more protection domains 270. A memory host 110 may have many protection domains 270 associated with various regions 114a-n of its memory 114. Each protection domain 270 may also have one or more associated connections 250.

When a client 120 instantiates a memory access request 122 for a file 310 stored on one or more of the memory hosts 110, the client 120 requests a file descriptor 300 from the curator 210 to identify which memory host(s) 110 store the data chunks $320n_k$ of the file 310. In addition to mapping data chunks $320n_k$ of the file 310 to memory regions 114a-n of memory hosts 110, the file descriptor 300 may also include a client key 321 for accessing those data chunks $320n_k$. The client 120 then searches a connection cache 252 for any open RDMA capable connections 250 to the identified memory hosts 110. If each memory host 110 fails to have an open connection 250 with the client 120 that is in the same protection domain 270 as the requested data chunk(s) $320n_k$, the client 120 sends a connection request 254 to any memory hosts 110 not having the necessary open connection(s) 250.

In response to receiving a connection request 254 from a client process 128 of a client 120 to access a data chunk $320n_k$ (e.g., to access a memory region 114a-n storing the data chunk $320n_k$), the host process 128 may establish a remote direct memory access capable connection 250 with the client process 128 when both the client 120 and the requested data chunk $320n_k$ are associated with the same access control list 260 received by the memory host 110. The client process 128 may include the access control list 260 in the connection request 254. The host process 118 may associate the established open connection 250 with a protection domain 270 and the client process 128 may store the open connection 250 in the connection cache 252. The connection 250 is capable of accessing (via RDMA) only the memory regions 114a-n associated with its protection domain 270. The network interface controller 216 of the memory host 110 may tear down the connection upon receiving an RDMA request having an address for unregistered memory 114.

In the example shown in FIG. 2E, first and second clients 120a, 120b send memory access requests 122 to a memory host 110n over respective first and second RDMA connections 250a, 250b. The memory host 110n has first and second protection domains 270a, 270b associated with its memory 114. The first protection domain 270a is associated with first and second memory regions 114a, 114b (e.g., storing corresponding first and second data chunks $320n_1$, $320n_2$) and the first RDMA connection 250a, while the second protection domain 270b is associated with a third memory region 114c (e.g. storing a corresponding third data chunks 320$n_3$) and only the second RDMA connection 250a.

The first client 120a sends first and second memory access requests 122a, 122b over the first RDMA connection 250a to the memory host 110n. The first memory access request 122a is for accessing the second memory region 114b for the second data chunk 320$n_2$ and the second memory access request 122b is for accessing the third memory region 114c for the third data chunk 320$n_3$. The first memory access request 122a succeeds, because the second memory region 114b belongs to the same protection domain 270a as the first connection 250a. The second memory access request 122b fails, because the third memory region 114c belongs to a different protection domain 250, the second protection domain 250b, rather than the protection domain 250 of the second memory access request 122b (i.e., the first protection domain 250a).

The second client 120b sends third and fourth memory access requests 122c, 122d over the second RDMA connection to the memory host 110n. The third memory access request 122c is for accessing the first memory region 114a for the first data chunk 320$n_1$ and the fourth memory access request 122d is for accessing the third memory region 114c for the third data chunk 320$n_3$. In this case, both memory access requests 122c, 122d succeed, because the RDMA connection 250b of the second client 120b belongs to the protection domains 270a, 270b of both the first memory region 114a and the third memory region 114c.

Referring again to FIG. 2C, in some implementations, the curator 210 can create, copy, resize, and delete files 310. Other operations are possible as well. To service a copy request 122cr from a client 120, the curator 210 creates a new file descriptor 300 having a state initially set to COPY PENDING. The curator 210 may set/initialize one or more of the following fields: size, owner, group, permissions, and/or backing file. The curator 210 populates a stripes array 325 of the file descriptor 300 (FIG. 3B) with empty stripes 320n and then commits the file descriptor 300 to its file map 214. Committing this information to the file map 214 allows the curator 210 to restart a resize operation if the curator 210 crashes or a tablet containing the file system metadata 212 migrates to another curator 210. Once the curator 210 commits the file descriptor 300 to the file map 214, the curator 210 responds to the client copy request 122cr by informing the client 120 that the copy operation has been initiated. The curator 210 initiates memory-host-pull-chunk operations, which instruct memory hosts 110 to allocate a new chunk 320$n_k$ and to read chunks 320$n_k$ of the backing file into the memory 114 of the memory hosts 110. When a pull-chunk operation returns successfully, the curator 210 adds the new chunk 320$n_k$ to the appropriate stripe 320n in the file descriptor 300. The curator 210 commits the stripe 320n with the new chunk 320$n_k$ to the file map 214.

In the case of a crash or a migration, incrementally updating the file descriptors 300 allows a new curator 210 to restart a copy operation from the location the prior curator 210 stopped. This also allows clients 120 to check the status of a copy operation by retrieving the file descriptor 300 (e.g., via a lookup method) and inspecting the number of stripes 320n in the file descriptor 300 populated with chunks 320$n_k$. Once all chunks 320$n_k$ have been copied to the memory hosts 110, the curator 210 transitions the state of the file descriptor 300 to READ and commits it to the file map 214.

The curator 210 may maintain status information for all memory hosts 110 that are part of the cell 200. The status information may include capacity, free space, load on the memory host 110, latency of the memory host 110 from a client's point of view, and a current state. The curator 210 may obtain this information by querying the memory hosts 110 in the cell 200 directly and/or by querying slowpoke clients 230 to gather latency statistics from a client's point of view. In some examples, the curator 210 uses the memory host status information to make rebalancing, draining, recovery decisions, and allocation decisions.

The curator(s) 210 may allocate chunks 320$n_k$ in order to handle client requests 122 for more storage space in a file 310 and for rebalancing and recovery. The curator 210 may maintain a load map 216 of memory host load and liveliness. In some implementations, the curator 210 allocates a chunk 320$n_k$ by generating a list of candidate memory hosts 110 and sends an allocate chunk request to each of the candidate memory hosts 110. If the memory host 110 is overloaded or has no available space, the memory host 110 can deny the request. In this case, the curator 210 selects a different memory host 110. Each curator 210 may continuously scan its designated portion of the file namespace, examining all the metadata 212 every minute or so. The curator 210 may use the file scan to check the integrity of the metadata 212, determine work that needs to be performed, and/or to generate statistics. The file scan may operate concurrently with other operations of the curator 210. The scan itself may not modify the metadata 212, but schedules work to be done by other components of the system and computes statistics.

For each file descriptor 300, the file scan may: ensure that the file descriptor 300 is well formed (e.g., where any problems may indicate a bug in either the curator or in the underlying storage of the metadata); update various statistics, such as the number of files 310, stripes 320n, chunks 320$n_k$, and the amount of storage used; look for stripes 320n that need recovery; determine if the file descriptor 300 contains chunks 320$n_k$ that are candidates for rebalancing from overfull memory hosts 110; determine if there are chunks 320$n_k$ on draining memory hosts 110; determine if there are chunks 320$n_k$ that are candidates for rebalancing to under-full memory hosts 110; determine chunks 320$n_k$ that can be deleted; and/or determine if the file descriptor 300 has a pending resize or copy operation, but there is no active task within the curator 210 working on the operation.

In some implementations, the distributed storage system 100 supports two types of files: immutable and mutable. Immutable files rely on a disk-based file system for persistence and fault-tolerance. A client 120 may copy immutable files into the file system of the distributed storage system 100. On the other hand, a client 120 may write mutable files into the file system of the distributed storage system 100 using the application programming interface (API) 400. The storage system 100 may or may not be durable. The distributed storage system 100 may have strict data loss service level objectives (SLOs) that depend on the files' level of replication. When a stripe 320n is lost, the curator 210 may allocate new storage for the lost stripe 320n and mark the data as uninitialized. A client 120 attempting to read an uninitialized stripe 320n receives an uninitialized data error. At this point, the client 120 can reinitialize the stripe's data.

The file descriptor 300 may provide the state of a file 310. A file 310 can be in one of the following states: READ, READ_WRITE, DELETED, or {CREATE, COPY, RESIZE}_PENDING. In the READ state, clients 120 can read the file 310, but not write to the file 310. Read-only files 310 are read-only for the entire life-time of the file 310, i.e., read-only files 310 are never written to directly. Instead, read-only files 310 can be copied into the file system from another file system. A backing file 310 may be used to restore data when a memory host 110 crashes; consequently, the backing file 310 persists for the entire life-time of the file 310. In the READ_WRITE state, clients 120 with the appropriate permissions can read and write a mutable file's contents. Mutable files 310 support concurrent, fine grain, random writes. Random and sequential write performance may be comparable. Writes are strongly consistent; that is, if any client 120 can observe the effect of a write, then all clients 120 can observe the effect of a write. Writes can also be batched into transactions. For example, a client 120 can issue a batch of asynchronous writes followed by a sync operation. Strong consistency and transactional semantics ensure that if any client 120 can observe any write in a transaction, then all clients 120 can observe all writes in a transaction. In the DELETED state, the file 310 has been deleted. The chunks $320n_k$ belonging to the file 310 are stored in a deleted chunks field and wait for garbage collection. The {CREATE, COPY, RESIZE}_PENDING state denotes a file 310 has a create, copy, or resize operation pending on the file.

An encoding specified by a file encoding protocol buffer of the file descriptor 300 may be used for all the stripes 320a-n within a file 310. In some examples, the file encoding contains the following fields: "data chunks," which provides a number of data chunks $320n_k$ per stripe 320n; "stripe length," which provides a number of bytes per stripe 320n; and "sub-stripe length," which provides a number of bytes per sub-stripe. The sub-stripe length may be only valid for READ_WRITE files. The data 312 for a file 310 may be described by an array of stripe protocol buffers 325 in the file descriptor 300. Each stripe 320n represents a fixed region of the file's data, identified by an index within the array. The contents of a stripe 320n may include an array of chunk protocol buffers 327, each describing a chunk $320n_k$ within the stripe 320n, including a chunk handle, an identity of the memory host 110 holding the chunk $320n_k$, and a current state of the chunk $320n_k$. For RDMA purposes, the chunk protocol buffers 327 may also store a virtual address of the chunk $320n_k$ in the memory host 110 and a client key 321 (e.g., a 32-bit key. The client key 321 is unique to a chunk $320n_k$ on a memory host 110 and is used to RDMA-read that chunk $320n_k$.

Stripes 320n can be further divided into sub-stripes 322n with associated sub-stripe metadata 324. Each sub-stripe 322n may include an array of sub-chunks 326a-n, each having corresponding associated sub-chunk metadata 328.

Chunks $320n_k$ can be in one of the following states: OK, Recovering, Migrating Source, and Migrating Destination. In the OK state, the contents are valid and the chunk $320n_k$ contributes to the replication state of the corresponding stripe 320n. Clients 120 may update all chunks $320n_k$ in a good state. In the Recovering state, the chunk Recovering is in the process of being recovered. The chunk Recovering does not count towards the replicated state of the corresponding stripe 320n and the data in the chunk $320n_k$ is not necessarily valid. Therefore, clients 120 cannot read data from chunks $320n_k$ in the Recovering state. However, all transactions not reaching their commit point at the time a chunk state changes to the Recovering state must include the Recovering chunk in the transaction in order to ensure that the chunk's data is kept up to date during recovery.

In the Migrating Source state, the chunk $320n_k$ is in the process of migrating. A migrating source attribute may provide a location from which the chunk $320n_k$ is migrating. The source chunk $320n_k$ counts towards the replication of the stripe 320n and the data in the chunk $320n_k$ is valid and can be read. In the Migrating Destination state, the chunk is in the process of migrating. A Migrating Destination attribute provides the location to which the chunk $320n_k$ is migrating. The source chunk $320n_k$ does not count towards the replicated state of the stripe 320n and the chunk $320n_k$ is not necessarily valid. Therefore, clients 120 cannot read from chunks $320n_k$ in the Migrating Destination state. However, all transactions not reaching their commit point at the time a chunk's state changes to the Migrating Destination state must include the Migrating Destination chunk $320n_k$ in the transaction in order to ensure the chunk's data is kept up to date as it is being migrated.

Each file descriptor 300 may have a dead chunks array. The dead chunks array holds additional chunks $320n_k$ that are no longer needed, such as the chunks $320n_k$ that made up a file 310 that has since been deleted, or made up previous instances of the file 310. When the file 310 is deleted or truncated, the chunks $320n_k$ from all the stripes 320n are moved into this dead chunks array and the stripes 320n are cleared. The chunks $320n_k$ in the dead chunks array are reclaimed in the background.

The application programming interface 400 may facilitate transactions having atomicity, consistency, isolation, durability (to a degree), such that the transaction may be serializable with respect to other transactions. ACID (atomicity, consistency, isolation, durability) is a set of properties that guarantee that database transactions are processed reliably. In the context of databases, a single logical operation on the data is called a transaction. Atomicity requires that each transaction is "all or nothing": if one part of the transaction fails, the entire transaction fails, and the database state is left unchanged. An atomic system guarantees atomicity in each and every situation, including power failures, errors, and crashes. Consistency ensures that any transaction brings the database from one valid state to another. Any data written to the database must be valid according to all defined rules, including but not limited to constraints, cascades, triggers, and any combination thereof. Isolation ensures that no transaction should be able to interfere with another transaction. One way of achieving this is to ensure that no transactions that affect the same rows can run concurrently, since their sequence, and hence the outcome, might be unpredictable. This property of ACID may be partly relaxed due to the huge speed decrease this type of concurrency management entails. Durability means that once a transaction has been committed, it will remain so, even in the event of power loss, crashes, or errors. In a relational database, for instance, once a group of SQL statements execute, the results need to be stored permanently. If the database crashes immediately thereafter, it should be possible to restore the database to the state after the last transaction committed.

Figure 4A:
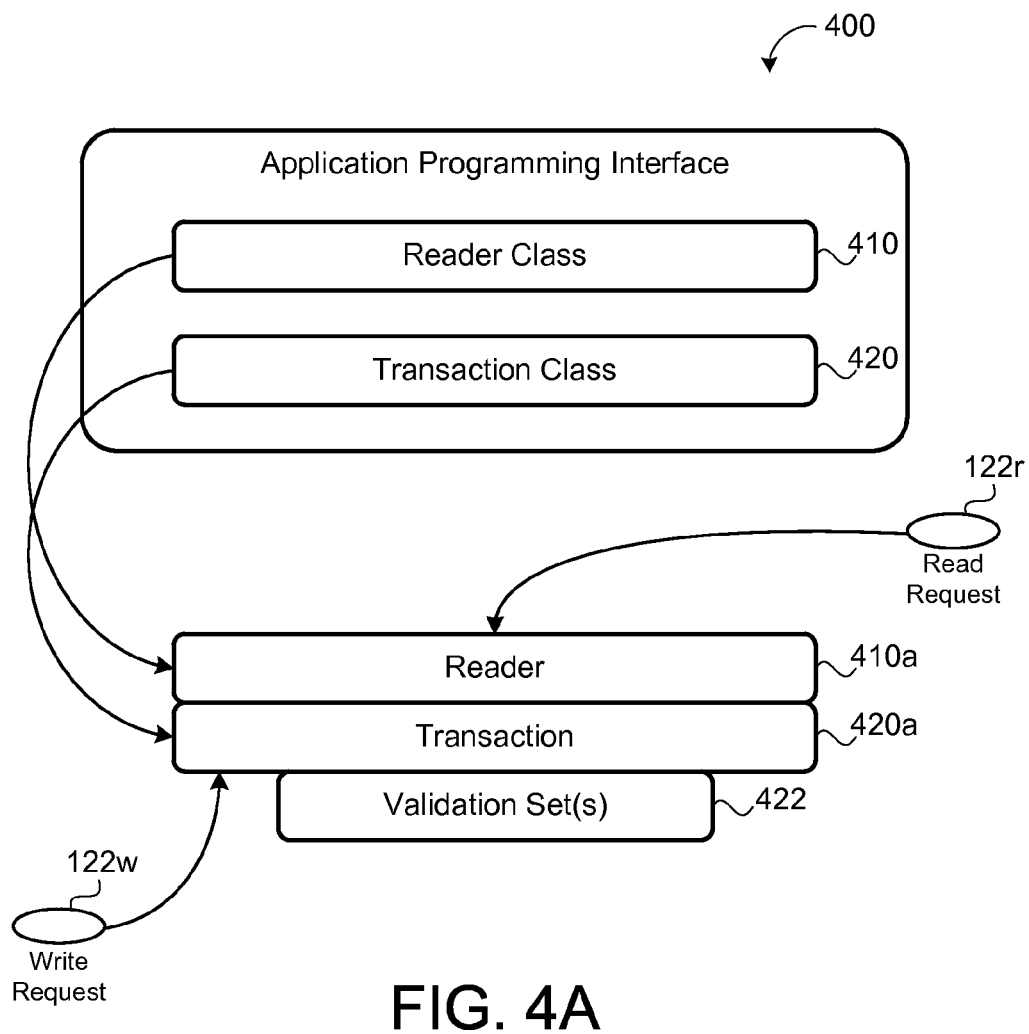
FIG. 4A is a schematic view of an exemplary application programming interface.
Figure 4B:
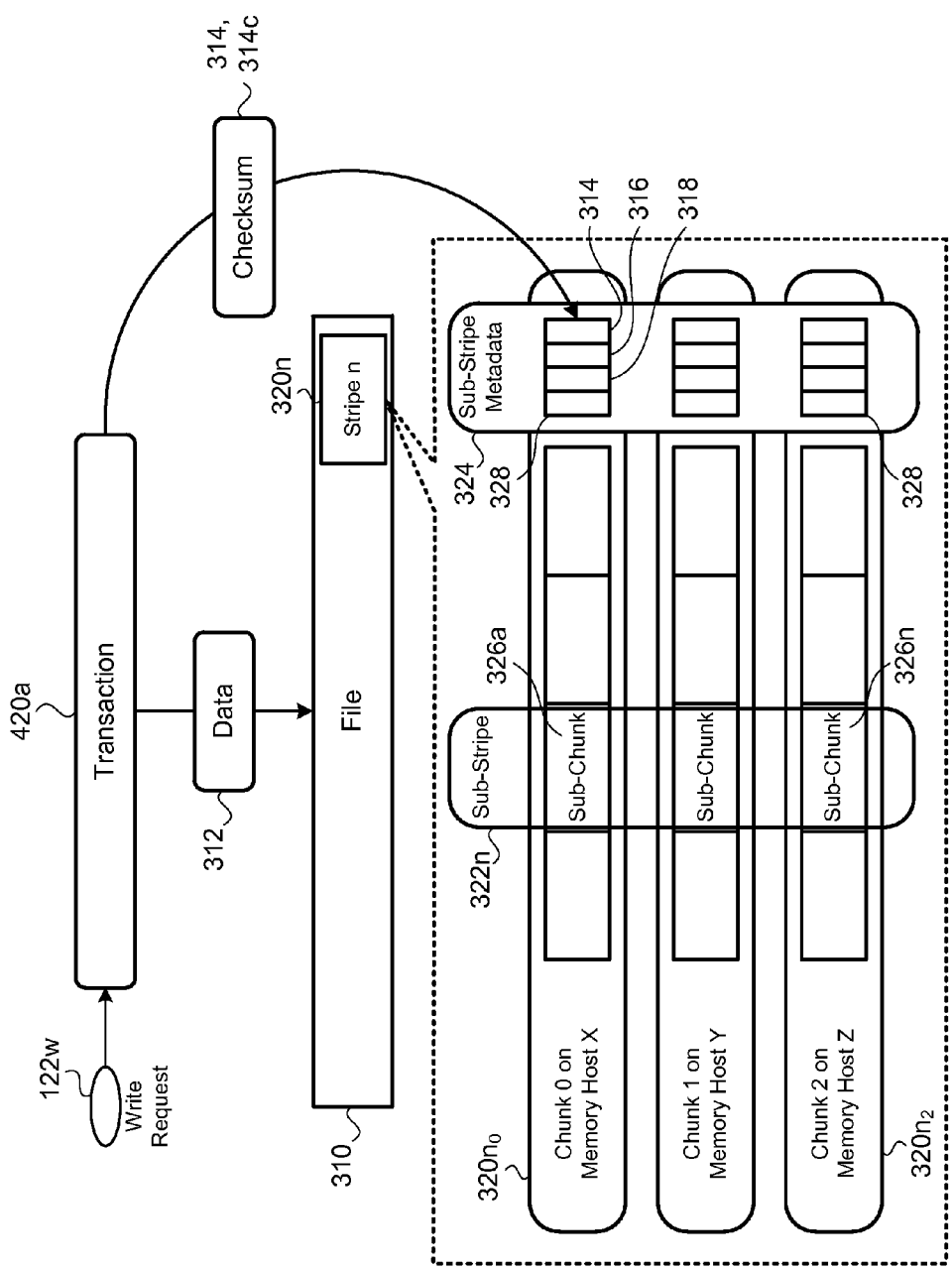
FIG. 4B is a schematic view of an exemplary transaction writing data to a file stored in a distributed storage system.
Figure 4C:
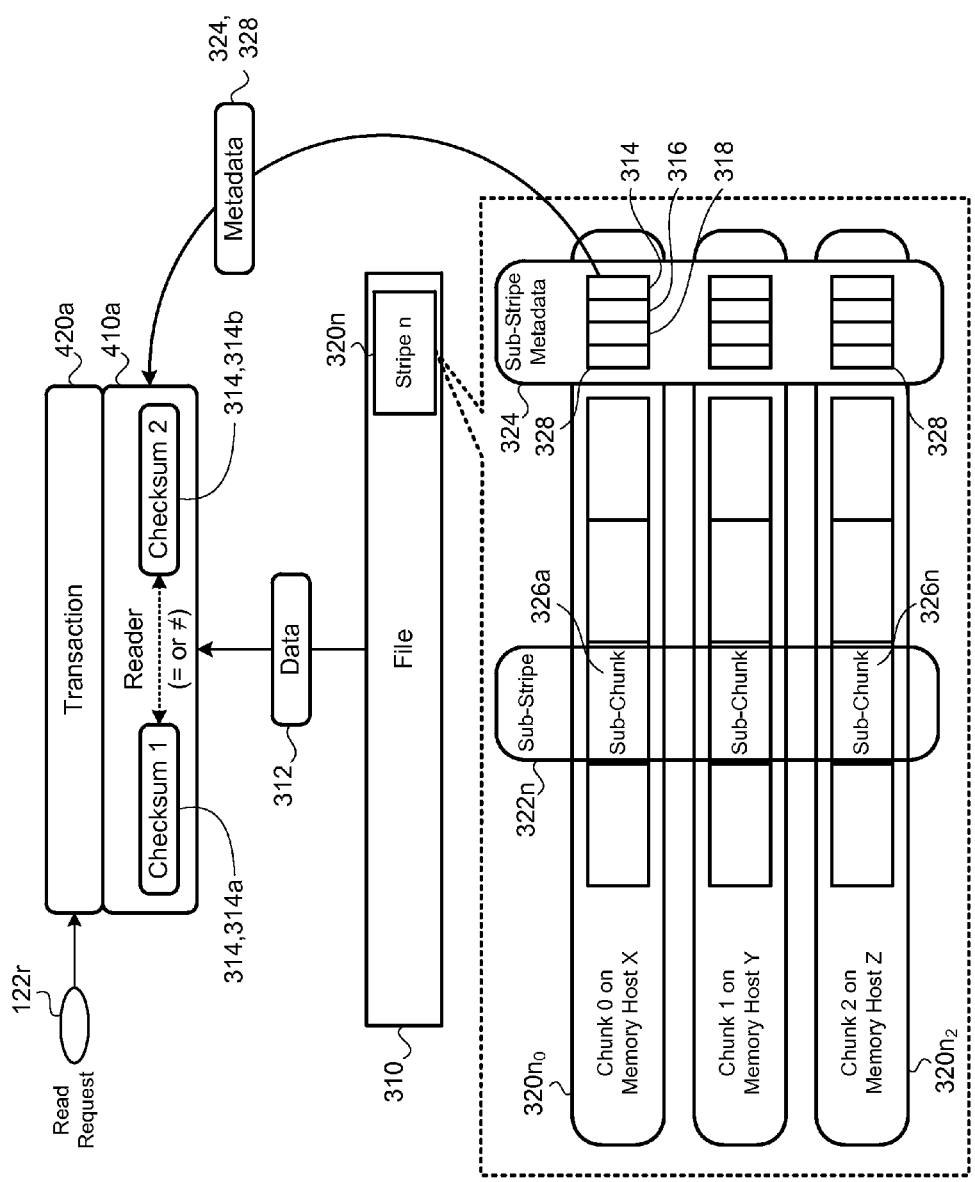
FIG. 4C is a schematic view of an exemplary transaction reading data from a file stored in a distributed storage system.

Referring to FIGS. 4A-4C, in some implementations, the application programming interface (API) 400 includes a reader class 410 and a transaction class 420. A client 120 may instantiate a reader 410a inheriting the reader class 410 to execute a read or batches of reads on the memory hosts 110 in a cell 200. Moreover, the client 120 may instantiate a transaction 420a inheriting the transaction class 420 to execute one or more reads and/or writes. The reads and writes in a transaction 420a may be to different files 310 in a cell 200, but in some implementations, all reads and writes in a transaction must be to files 310 in the same cell 200. Executed reads may be "snapshot consistent," meaning that all reads in a transaction 420a can see a snapshot of the file 310 at a logical instant in time. Writes can be buffered until the client 120 tries to commit the transaction 420a.

Referring to FIG. 4B, in response to receiving a write memory access request 122w for a file 310, a transaction 420a may (acting as a writer) write or modify data 312 of the file 310 (e.g., of chunks $320n_k$ and/or sub-chunks 326a-n). After the write operation, the transaction 420a may compute a checksum 314 of the modified data 312 and associate the checksum 314 with the modified data 312 (e.g., with the chunks $320n_k$ and/or sub-chunks 326a-n). In some examples, the transaction 420a stores the checksum 314 in the sub-chunk metadata 328 for the modified sub-chunk 326n. The transaction 420a may execute a hash function, such as a cryptographic hash function, to compute the checksum 314. Moreover, the hash function may be configured for randomization. Each checksum 314 may be a word having at least 64 bits. A network interface controller 116 servicing the remote direct memory access requests 122 on a corresponding memory host 110 may determine the checksum 314 of any data accessed on its memory host 110.

When a client 120 adds a file read request 122r to the reader 410a (e.g., via a transaction 420a), the reader 410a translates the read request 122r into a RDMA read network operation and stores a state of the network operation in memory allocated for the reader 410a. Reads that cross chunk boundaries get translated into multiple RDMA operations.

In some implementations, to translate a file read request 122r into a RDMA read network operation, the reader 410a computes a target stripe number from a file offset of the read request 122r. The reader 410a may use the stripe number to index into a chunk handle cache. The chunk handle cache returns a network channel to access the corresponding chunk $320n_k$ and a virtual address and r-key 321 of the chunk $320n_k$. The reader 410a stores the network channel and r-key 321 directly in an operation state of the RDMA read. The reader 410a uses the virtual address of the chunk $320n_k$ and the file offset to compute the virtual address within the chunk $320n_k$ to read. The reader 410a computes the offset into a memory block supplied by the client 120 (e.g., a receiving memory block for each RDMA read operation). The reader 410a may then initialize an operation status.

While buffering new reads, the reader 410a may calculate and store a running sum of the amount of metadata that will be retrieved to complete the read. This allows metadata buffer space to be allocated in one contiguous block during execution, minimizing allocation overhead.

In response to receiving a memory access request 122 from the client 120, the transaction 420a may retrieve a file descriptor 300 from the curator 210 that maps requested data chunks $320n_k$ of a file 310 on memory hosts 110 for remote direct memory access of those data chunks $320n_k$ on the memory hosts 110. The file descriptor 300 may include a client key 321 for each data chunk $320n_k$ of the file 310. Moreover, each client key 321 allows access to the corresponding data chunk $320n_k$ on its memory host 110.

Referring to FIG. 4C, in some implementations, the reader 410a executes a read operation in two phases. In the first phase, the reader 410a reads the data 312 and associated metadata 324, 328 of a file 310. In the second phase, the reader 410a validates that the data 312 read in the first phase satisfies data consistency constraints of the reader 410a. In the first phase, the reader 410a identifies one or more memory locations corresponding to the data 312 and transmits its RDMA read operations. While iterating through and transmitting RDMA reads, the reader 410a initializes and transmits RDMA reads to read sub-chunk metadata 328 and to read data 312 needed to compute checksums 314 of the sub-chunks 326a-n, such as of the first and last sub-chunks 326a, 326n in an unaligned file access. After the data 312 and metadata 328 are received, the reader 410a may check lock-words in the sub-chunk metadata 328 to ensure that the sub-chunks 326a-n were not locked while the data 312 was being read. If a sub-chunk 326a-n was locked, the reader 410a rereads the sub-chunk 326a-n and its corresponding metadata 328. Once the reader 410a finds (reads) all of the sub-chunk locks in an unlocked state, the reader 410a computes the sub-chunk checksums 314 and compares the computed checksums 314 with the checksums 314 read from the sub-chunk metadata 328.

In other words, for detecting read/write conflicts, the reader 410a, in response to receiving a read memory access request 122r for data 312 of a file 310 stored in the memory hosts 110 of a cell 200, may compute a first checksum 314a of the data 312, compare the first checksum 314a with a second checksum 314b associated with the data 312 (e.g., stored in the metadata 328 of the corresponding sub-chunk 326n), and allow a read operation on the data 312 when the first and second checksums 314a, 314b match. The reader 410a may execute a hash function, such as a cryptographic hash function, to compute the checksums 314. The reader 410a may read the data 312 and metadata 328 associated with the data 312 after receiving the read/write request 122 and before processing the read/write request 122. Moreover, the reader 410a may determine whether the data 312 was locked while reading the data 312, for example, by evaluating a lock word and/or a version number stored in the metadata 328. The reader 410a rereads the data 312 and associated metadata 328 when the data 312 was locked while previously reading the data 312.

While checksums are commonly used to guard against hardware error, or even software error, using it to guard against what is actually normal operation poses certain additional requirements. Since a conflict may not be a rare event, the chance of getting a coincidentally-matching checksum can be minimized by having checksum size large enough to provide a relatively small probability of a coincidental match. In some examples, a 64-bit checksum is sufficient, since checking a random bad checksum every nanosecond may produce a false positive less than once every five centuries, which is much less frequent than the rates of other types of system failures. Additionally, a hash function for computing the checksum 314 may produce different numbers for all common modifications of the data. For example, simply adding up all the data would not suffice, since a change that simply re-ordered some of the data would not change the checksum. However, a cryptographic hash functions which, by design, does not allow simple modifications of the data to produce any predictable checksum, may be sufficient.

A sub-chunk checksum 314 may fail a compare for one of three reasons: 1) the data read was corrupted by a concurrent write; 2) the data was corrupted while in transit to the client; or 3) the data stored in the memory host is corrupt. Cases 1 and 2 are transient errors. Transient errors are resolved by retrying the sub-chunk read. Case 3 is a permanent error that may require the client to notify the curator of a corrupt sub-stripe 322n.

To differentiate between a transient error and a permanent error, the client 120 may re-read the sub-chunk data 312 and the sub-chunk metadata 328. The reader 410a then checks a sub-chunk lock-word 316 and re-computes and compares the sub-chunk checksum 314. If the checksum error still exists and a sub-chunk version number 318 has changed since the sub-chunk 326n was initially read, then the checksum compare failure was likely caused by a concurrent write so the reader 410a retries the sub-chunk read. If the version number 318 has not changed since the sub-chunk 326n was initially read, then the error is permanent and the reader 410a notifies the curator 210, and the curator 210 tries to reconstruct the data of the chunk $320n_k$. If the curator 210 is unable to reconstruct the chunk data, the curator 210 replaces the old chunk $320n_k$ with a new uninitialized chunk $320n_k$.

Unlike locking, the checksum compare method for detecting read/write conflicts does not actually care if a conflicting write existed, as long as the data is consistent. For example, if the data is being overwritten with identical data, or if a write is preparing to start, but has not actually begun, or has just finished, the locking method will cause the read to fail unnecessarily, while the checksum compare will allow the read to succeed. Since the time between locking and unlocking may be much greater than the duration of an actual write, this can be a significant improvement.

The reader 410a does not know which version 318 of the data 312 it has read, and it may not matter. If it is advantageous to have the read obtain a version number 318, this may be done without an additional round-trip latency penalty if the version number 318 itself is covered by the checksum 314. Although computing checksums 314 may incur a nontrivial penalty in processor time, both for the reader 410a and the writer 420a, a checksum 314 may be necessary anyway to guard against hardware errors, depending on the implementation.

Sub-chunk locks may become stuck due to a client 120 trying to execute a transaction 420a but crashing during a commit protocol of the transaction 420a. A reader 410a can detect a stuck lock by re-reading the sub-chunk lock-word 316 and version number 318. If a sub-chunk lock-word 316 and version number 318 do not change during some time out period, then the sub-chunk lock is likely stuck. When the reader 410a detects a stuck lock, it notifies the curator 210 of the stuck lock and the curator 210 recovers the sub-stripe 322n and resets the stuck lock.

Figure 4D:
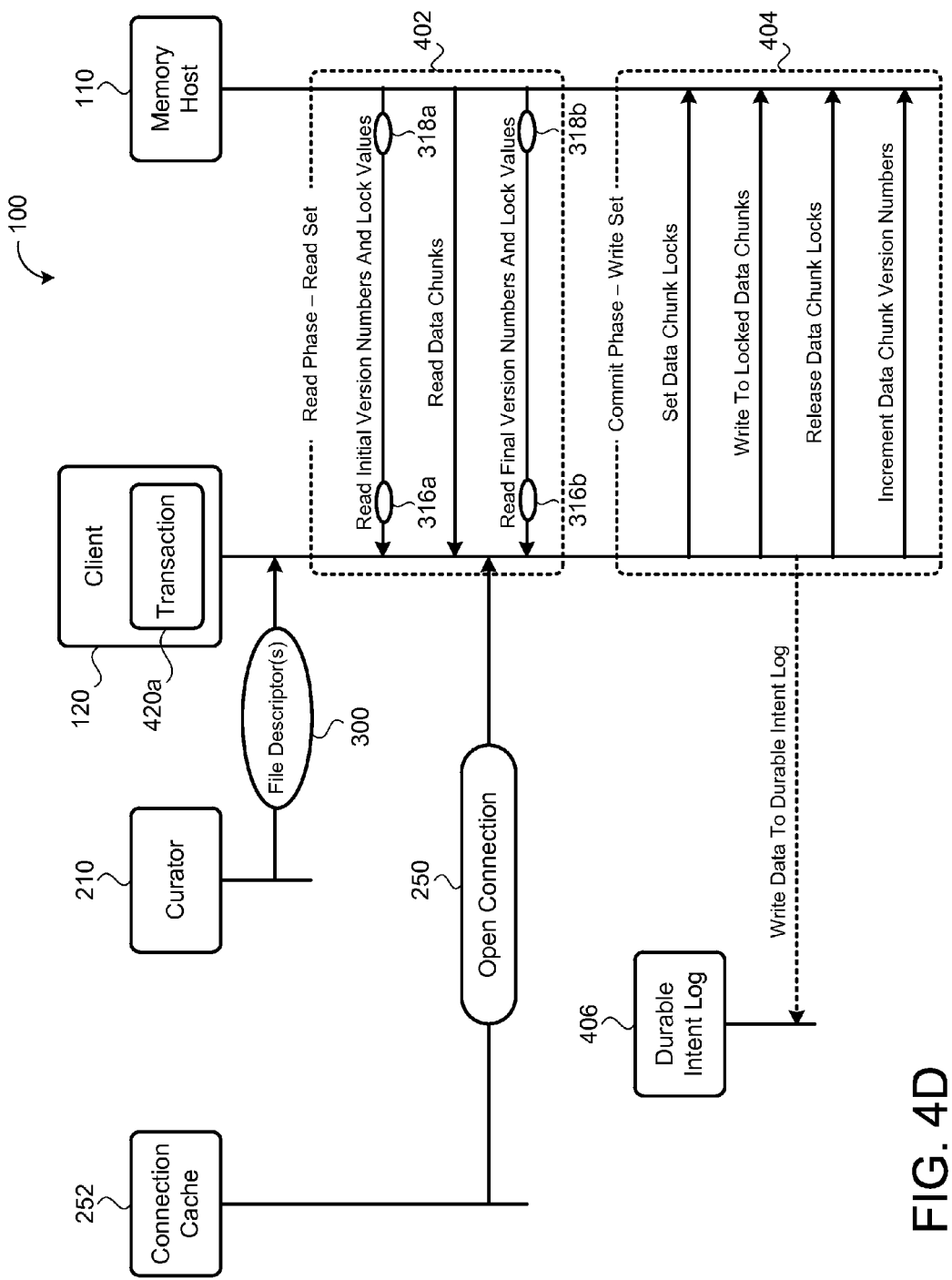
FIG. 4D is a schematic view of a client reading and writing data in an exemplary distributed storage system.

Referring also to FIGS. 4A and 4D, in some implementations, after the reader 410a validates each sub-chunk lock-word 316 and/or checksum 314, the reader 410a may proceed to the second phase of executing the read operation (i.e., the validation phase). To validate the values, the reader 410a rereads sub-chunk metadata 328 and rechecks if the sub-chunk lock-words 316 are unlocked and the sub-chunk version numbers 318 have not changed since the version numbers 318 were initially read during the first phase of the read operation. In other words, the reader 410a may read an initial version number 318a and an initial lock value 316a associated with each data chunk $320n_k$ of a read set 402 of the transaction 420a. After reading the data 312, the reader 410a reads a final version number 318b and a final lock value 316b associated with each data chunk $320n_k$ of the read set 402 and determines the read data as valid when the initial version number 318a matches the final version number 318b and the initial lock value 316a matches the final lock value 316b.

If the reader 410a is associated with a transaction 420a, the reader 410a may reread the metadata 328 associated with all sub-chunks 326n read by the transaction 420a. If a single sub-chunk version number 318 mis-compares, the reader 410a returns an error. If all sub-chunk version numbers 318 are the same, the reader 410a discards the prefix and suffix of the reader memory block in order to trim extraneous data read to compute the checksum 314 of the first and last sub-chunks 326a, 326n in the read. The reader 410a may set a status to OK and returns to the client 120.

If the reader 410a encounters an error on a network channel while reading data or metadata of a chunk, the reader 410a may select a different chunk $320n_k$ from the chunk handle cache and notifies the curator 210 of a bad memory host. If no other good chunks $320n_k$ exist from which the reader 410a can read, the reader 410a may wait to receive a response to the error notification it sent to the curator 210. The response from the curator 210 may contain an updated file descriptor 300 that contains a new good chunk $320n_k$ to read from.

In some implementations, the transaction class 420 uses validation sets 422 to track which sub-stripes 322n have been read by the transaction 420a. Each read of a transaction 420a adds the version numbers 318 of all sub-stripes 322n read to a validation set 422 of the transaction 420a. The transaction 420a may validate the validation set 422 in two cases: 1) as part of the commit protocol and 2) the validation phase of reads of a transaction 420a. A transaction 420a may fail to commit if the commit protocol finds that any sub-stripe version number 318 differs from the number recorded in the validation set 422. Validation of the full validation set 422 before data is returned to the client 120 allows early detection (e.g., before the commit phase) of a doomed transaction 420a. This validation also prevents the client 120 from getting an inconsistent view of file data.

A transaction 420a may provide a synchronous, serializable read operation (e.g., using a reader). In some examples, a reader 410a is instantiated and associated with the transaction 420a. Read results of the reader 410a return the latest committed data. As such, uncommitted writes of the same transaction 420a are not seen by a read of that transaction 420a.

A transaction 420a may buffer data for a later transaction commit. The transaction class 420 translates a buffer write request into one or more 'prepare write' network operations. One network operation is needed for each stripe 320n touched by the write operation. Processing a buffer write request may involve preparing 'sub-stripe lock' network operations. One lock operation is needed for each sub-stripe 322n touched by the requested write. These operations are buffered for transmission during the transaction commit. The transaction 420a may translate buffer write requests into network operations and execute identify or coalesce writes that affect the same region of a file 310. The transaction 420a may apply write operations in the same order by the memory hosts 110 for all chunks $320n_k$ to ensure that all replicas are consistent.

The transaction 420a may provide a commit operation that results in all reads and writes in the transaction 420a being schedulable as a single atomic, serializable operation. In some implementations, the transaction commit protocol proceeds through a lock phase, a validate phase, a write phase, and an unlock phase. During the lock phase, the sub-stripe lock network operations which were created in response to buffer write requests are sent. Each sub-stripe lock operation executes an atomic compare-and-swap operation on the lock-word in all replicas 320nk. If the contents of the lock-word match the specified compare data (e.g., a client identifier), the lock-word is written with the specified swap data, and the previous contents of the word are returned. If the client 120 succeeds in writing its unique client ID into the metadata lock-word, it has successfully taken the lock. If the transaction 420a fails to take the lock for any sub-stripe 322n in the write set, the commit fails and is aborted. The commit protocol proceeds to the validate phase once all sub-stripe locks are held.

During the validate phase, the transaction 420a may read the version number 318 out of the metadata 324 for all sub-stripes 322n referenced in the validation set and comparing the version numbers 318 to the version numbers 318 recorded in the validation set. If a version number 318 does not match, the sub-stripe 322n was written by another transaction 420a after it was read by this transaction 420a, so the transaction 420a fails. In this case, the reader 410a releases the locks it holds and returns a transaction conflict error to the client 120. Once all version numbers 318 in the validation set have been validated, the client 120 writes the buffered write data of the transaction 420a to each replica $320n_k$ and updates the metadata 324 associated with each sub-stripe 322n written by the transaction 420a, during the write phase. Updating metadata 324 of a sub-stripe 322n may include computing and writing a new check-word 314, 316 and incrementing the version number 318 of the sub-stripe 322n. Once all data 312 and metadata 324, 328 has been updated, the transaction 420a releases the locks that it holds, during the unlock phase.

File transaction access may provide exclusive read/write access to the state of a file descriptor 300. Updates to the file state may be applied at the end of a transaction 420a and are atomic. File transaction access can be used for operations such as creating, finalizing, and deleting a file 310. These operations may require the curator 210 to communicate with other components such as memory hosts and thus a file transaction access may last for several seconds or more. While active, the file transaction access blocks any other operations that need to modify the state of the file descriptor 300. Read access may not be blocked.

To reduce contention, stripe transaction access may provide relatively finer grain synchronization for operations that only need to modify the state of a single stripe 320n with the file descriptor 300. This mode can be used for stripe operations such as opening, closing, rebalancing, and recovering. There can be many concurrent stripe transactions for different stripes 320n within a file 310, but stripe transactions and file transactions are mutually exclusive. Within a stripe transaction, the curator 210 may examine the state of a stripe 320n and various fields of the file descriptor 300 that remain immutable for the duration of the transaction 420a, such as the file encoding and instance identifier. The stripe transaction access does not provide access to fields that can change underfoot, such as the state of other stripes 320n. Operations may hold only one active transaction 420a at a time to avoid deadlock. Moreover, transactions 420a may only atomically commit on a single file 310.

Referring again to FIGS. 2A and 2B, the distributed storage system 100 may include one or more stripe doctors 220 in each cell 200 that fix and recover stripe data. For example, each cell 200 may have several stripe doctors 220 that execute rebalancing and recovery operations. Additionally or alternatively, the distributed storage system 100 may include one or more slowpoke clients 230 that monitor a cell's performance from a client's prospective. A slowpoke client 230 provides latency information to the curator(s) for chunk allocation and rebalancing. For example, each slowpoke client 230 collects latency statistics for every memory host 110 in a cell. A cell 200 may have several slowpoke clients 230 to improve network path coverage and fault tolerance. Since it is unlikely that the curator may completely lose the latest latency statistics for a memory host 110 in the cell 200, curators 210 can make chunk allocation and rebalancing decisions without the slowpoke latency information.

Figure 5:
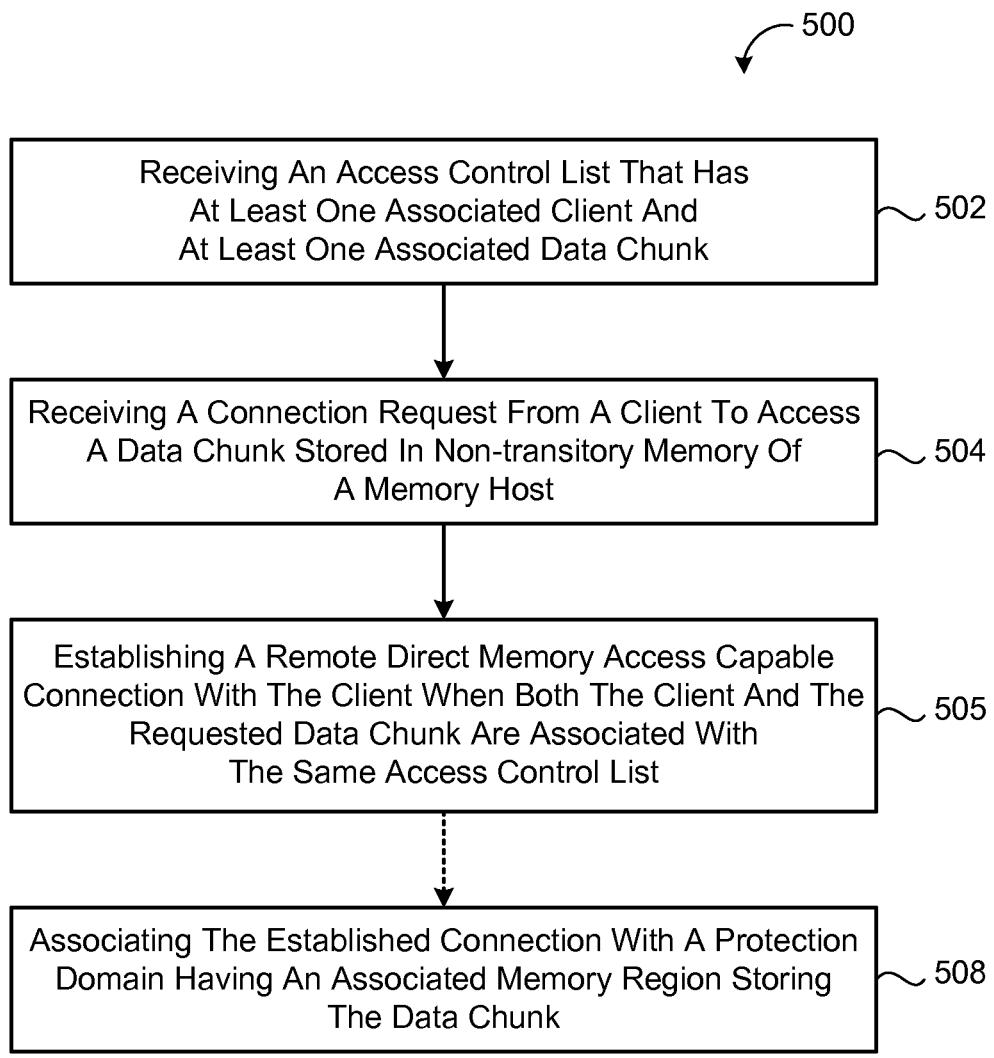
FIG. 5 is a schematic view of an exemplary arrangement of operations for a method of controlling access in a distributed storage system.

FIG. 5 provides an exemplary arrangement 500 of operations for a method of controlling access in a distributed storage system 100. The method includes receiving 502 an access control list 260 that has at least one associated client 120 and at least one at least one associated data chunk $320n_k$, receiving 504 a connection request 254 from a client 120 to access a data chunk $320n_k$ stored in non-transitory memory 114 of a memory host 110, and establishing 506 a remote direct memory access capable connection 250 with the client 120 when both the client 120 and the requested data chunk $320n_k$ are associated with the same access control list 260.

In some implementations, the method includes associating 508 the established connection 250 with a protection domain 270 having an associated memory region 114n storing the data chunk $320n_k$. The connection 250 is capable of accessing only memory regions 114a-n associated with its protection domain 270. Moreover, the protection domain 270 is capable of being associated with one or more connections 250. The method may include allocating memory 114 for the data chunk $320n_k$ (e.g., via the curator 210) and associating the allocated memory 114 with the protection domain 270.

The method may include executing a connection handshake with the client 120 to establish the remote direct memory access capable connection 250. In some examples, the method includes evaluating an identity of the client 120, such as by executing a client authentication routine. If a received remote direct memory access request 122 includes an address for unregistered memory 114, the method may include tearing down the connection 250.

The method may include registering remote direct memory accessible regions 114a-n of memory 114 with a network interface controller 116 of the memory host 110. The remote direct memory accessible memory regions 114a-n may be registered with a permission of read-only or read/write.

In some implementations, the method includes allocating memory 114 for the data chunk $320n_k$ (e.g., via the curator 210) and associating the data chunk $320n_k$ with the access control list 260. The method may include assigning an access permission for each client or each data chunk $320n_k$ associated with the access control list 260.

In response to receiving a memory access request 122 from the client 120, the method may include returning a file descriptor 300 that maps data chunks $320n_k$ of the file 310 on memory hosts 110 for remote direct memory access of the data chunks $320n_k$ on the memory hosts 110. The file descriptor 300 may include a client key 321 for each data chunk $320n_k$ of the file 310. Moreover, each client key 321 allows access to the corresponding data chunk $320n_k$ on its memory host 110.

Figure 6:
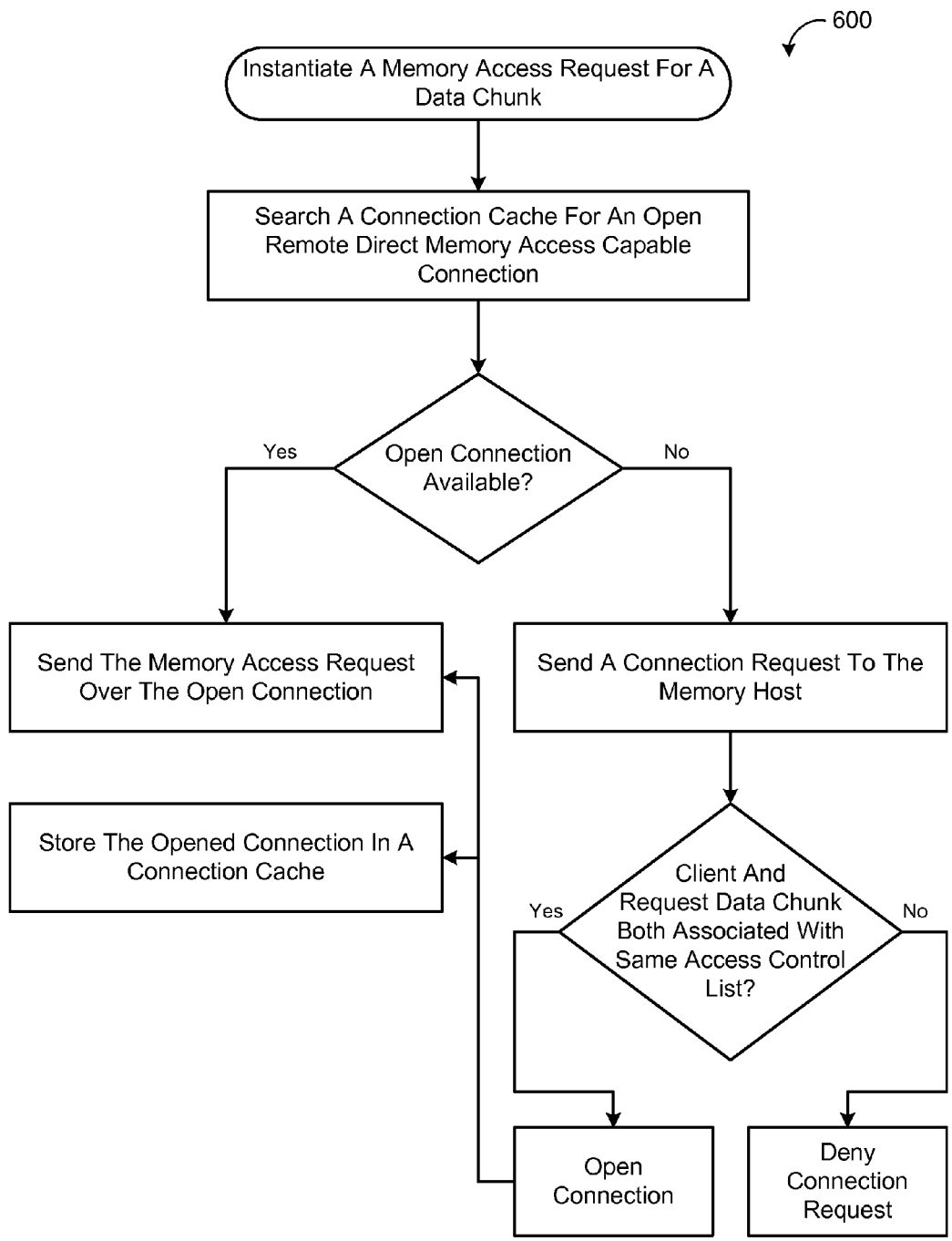
FIG. 6 is a schematic view of an exemplary flow chart illustrating a method of accessing data stored on a distributed storage system.

FIG. 6 provides an exemplary flow chart 600 illustrating a method of accessing data stored on a distributed storage system 100. In some implementations, the method includes instantiating a memory access request 122 for a data chunk $320n_k$ stored in non-transitory memory 114 of a memory host 110 of the distributed storage system 100 and searching a connection cache 252 for an open remote direct memory access capable connection 250 to the memory host 110 that is associated with a protection domain 270 of the memory 114 storing the requested data chunk $320n_k$. If the connection cache 252 fails to contain the open connection 250, the method includes sending a connection request 254 to the memory host 110. The memory host 110 establishes the remote direct memory access capable connection 250 when both a client 120 instantiating the connection request 254 and the requested data chunk $320n_k$ are associated with the same access control list 260. The connection request 254 may include the access control list 260. The method includes sending the memory access request 122 to the memory host 110 over the open connection 250 and storing the open connection 250 in the connection cache 252. The method may include executing a connection handshake with a network interface controller 116 of the memory host 110 to establish the remote direct memory access capable connection 250.

The method may include receiving a file descriptor 300 mapping data chunk $320n_k$ to the memory hosts 110. The file descriptor 300 may include a client key 321 allowing access to the corresponding data chunk $320n_k$ on its memory host 110. The method may include sending a memory access request 122 for multiple data chunks $320n_k$ stored in the memory 110 of the memory host 110, where two or more of the data chunks $320n_k$ are associated with different access control lists 260.

Figure 7:
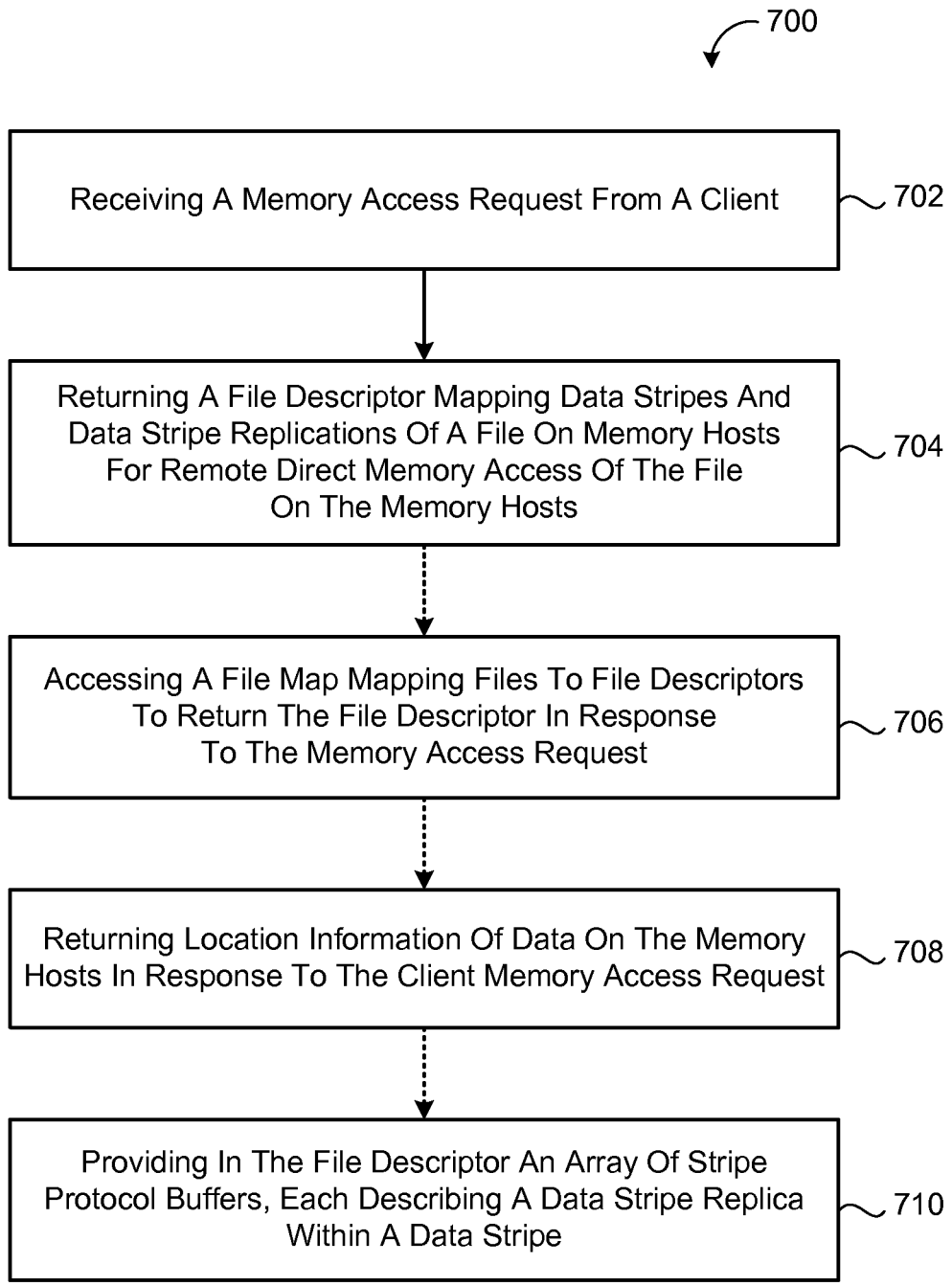
FIG. 7 is a schematic view of an exemplary arrangement of operations for a method of providing access to data stored on a distributed storage system.

FIG. 7 provides an exemplary arrangement 700 of operations for a method of providing access to data stored on a distributed storage system 100. The method includes electronically receiving 702 a memory access request 122 from a client 120 and returning a file descriptor 300 mapping data stripes 320n and data stripe replications 320$n_k$ of a file 310 on memory hosts 110 for remote direct memory access (RDMA) of the file 310 on the memory hosts 110.

In some implementations, the method includes accessing 706 a file map 214 mapping files 310 to file descriptors 300 to return the file descriptor 300 in response to the memory access request 122. The method may include returning 708 location information of data 312 on the memory hosts 110 in response to the client memory access request 122. The method may include returning a key to allow access to data on the memory hosts 110 in response to the client memory access request 122. In some examples, the method includes allocating storage of a data stripe 320n on the memory hosts 110. The method may include dividing the file 310 into data stripes 320n and replicating each data stripe 320n into multiple storage locations of the memory hosts 110.

In some implementations, the method includes providing at least one of a file state attribute providing a state of a file, a data chunks attribute providing a number of stripe replicas 320$n_k$ per stripe 320n, a stripe length attribute providing a number of bytes per stripe 320n, and a sub-stripe length attribute providing a number of bytes per sub-stripe 322n in the file descriptor 300. The method may include providing 710 in the file descriptor 300 an array of stripe protocol buffers 325, each describing a data stripe replica 320$n_k$ within a data stripe 320n.

Servicing storage requests 122 in hardware provides a number of advantages, such as having relatively simple storage requests (e.g., read, write). Implementing such functionality in an application specific integrated circuit (ASIC) can be much more efficient than implementing the functionality in software running on a general-purpose processor. This efficiency improvement means storage requests 122 can be serviced in less time and occupy fewer circuits when compared to implementing the same functionality in software running on a general-purpose processor. In turn, this improvement means a distributed storage system 100 can achieve lower latency and higher throughput without increasing the cost of the system.

Servicing storage requests 122 in the network interface hardware (e.g., NIC) decouples processor resources 112 and storage resources 114. A client 120 can access storage resources 114 on a memory host 110 without available processor resources 112. This allows system builders and administrators to operate a distributed storage system 100 with high processor utilization, with low and predictable latencies, and without stranding storage resources. In some implementations, the distributed storage system 100 can provide an average read latency of less than 10 microseconds, an average read throughput of greater than 2 million operations per second per client, and average write latency of less than 50 microseconds, and/or an average write throughput of greater than 500 thousand operations per second per client.

Figure 8:
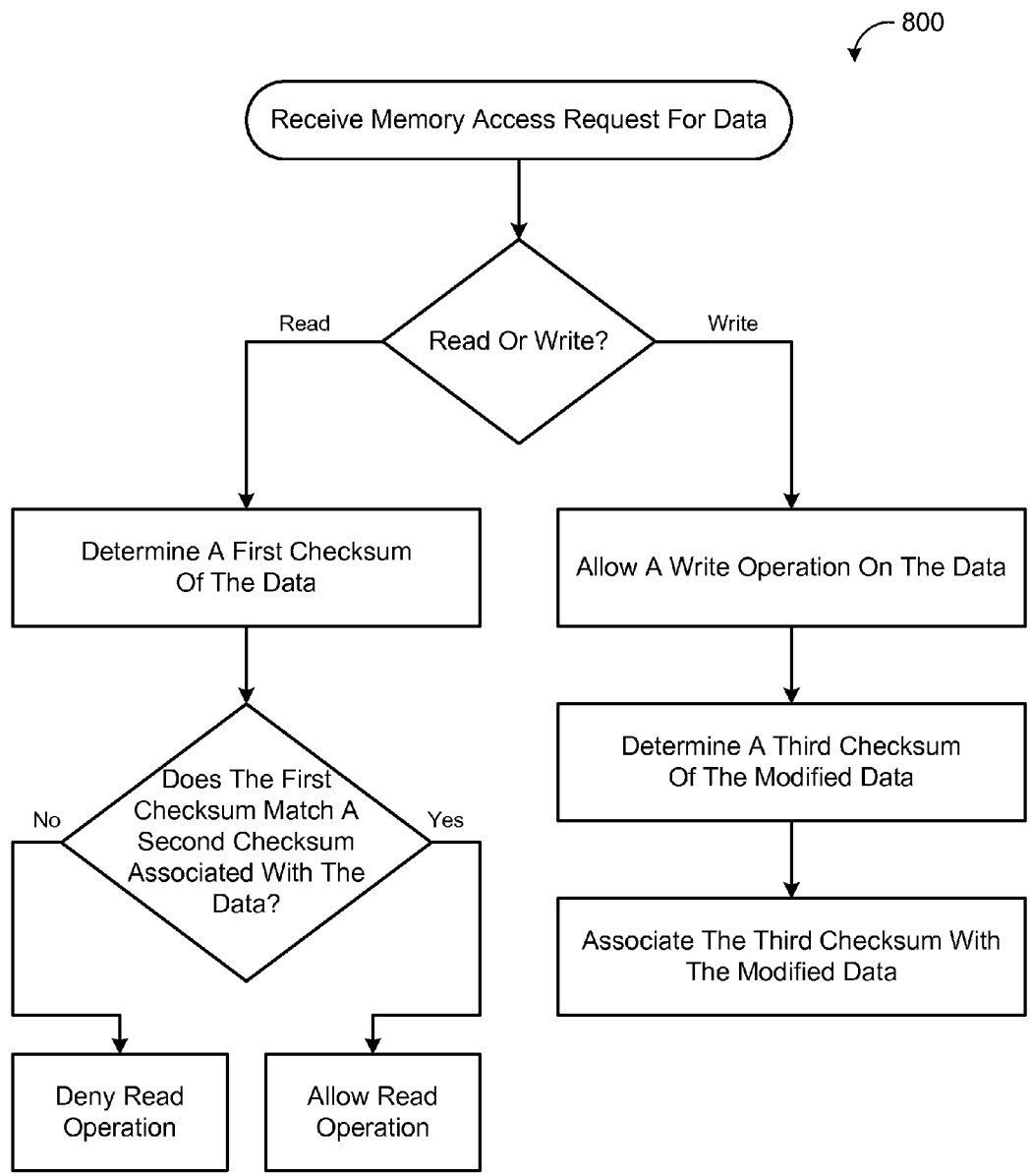
FIG. 8 is a schematic view of an exemplary flow chart for a method of managing read/write requests in a distributed data storage system.

FIG. 8 provides an exemplary flow chart 800 illustrating a method of managing read/write requests 122 in a non-transitory data storage system 100. The method includes receiving a read/write request 122 for data 312 stored in the data storage system 100 and processing the read/write request 122 on at least one computing processor 112, 202. For a read request 122r, the method includes computing a first checksum 314a (e.g., a word having at least 64 bits) of the data 312 (e.g., a sub-chunk 326n), comparing the first checksum 314a with a second checksum 314b associated with the data 312, 326n, and allowing a read operation of the read/write request 122r on the data 312, 326n when the first and second checksums 314, 314b match. For a write request 122w, the method includes allowing a write operation of the read/write request 122w on the data 312, 326n, computing a third checksum 314c of the modified data 312, 326n, and associating the third checksum 314c with the modified data 312, 326n.

In some implementations, the method includes executing a hash function, such as a cryptographic hash function, to compute at least one of the checksums 314a-c. The method may include associating metadata 324, 328 with the data 312, 326n (e.g., the sub-chunk 326n), where the metadata 324, 328 includes a checksum word containing the checksum 314 associated with the data 312, 326n. In some examples, the method includes reading the data 312, 326n and metadata 328 associated with the data 312, 326n after receiving the read/write request 122 and before processing the read/write request 122. The method may include determining whether the data 312, 326n was locked while reading the data 312, 326n and/or evaluating a lock word and a version number stored in the metadata 328. When the data 312, 326n was locked while previously reading the data 312, 326n, the method may include rereading the data 312, 326n and associated metadata 328.

The method may include identifying one or more memory locations 114a-n corresponding to the data 312, 326n and transmitting remote direct memory access requests 122 to each identified memory location 114a-n. Moreover, the method may include receiving a file descriptor 300 of a file 310 containing the data 312, 326n. The file descriptor 300 maps data stripes 320a-n and data stripe replications 320$n_1$-k of the file 310 on memory hosts 110 for remote direct memory access. The method may include accessing a file map 214 mapping files 310 to file descriptors 300 to return the file descriptor 300. In some examples, the method includes receiving a key 321 (e.g., in the file descriptor 300) allowing access to the data 312, 326n on the memory hosts 110.

Figure 9A:
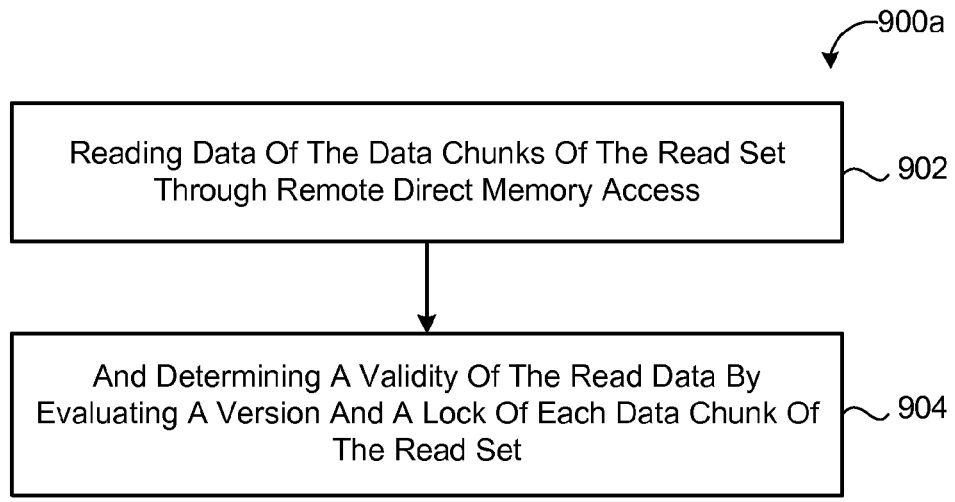
FIGS. 9A and 9B provide schematic views of an exemplary arrangement of operations for a method executing a transaction in a distributed storage system.
Figure 9B:
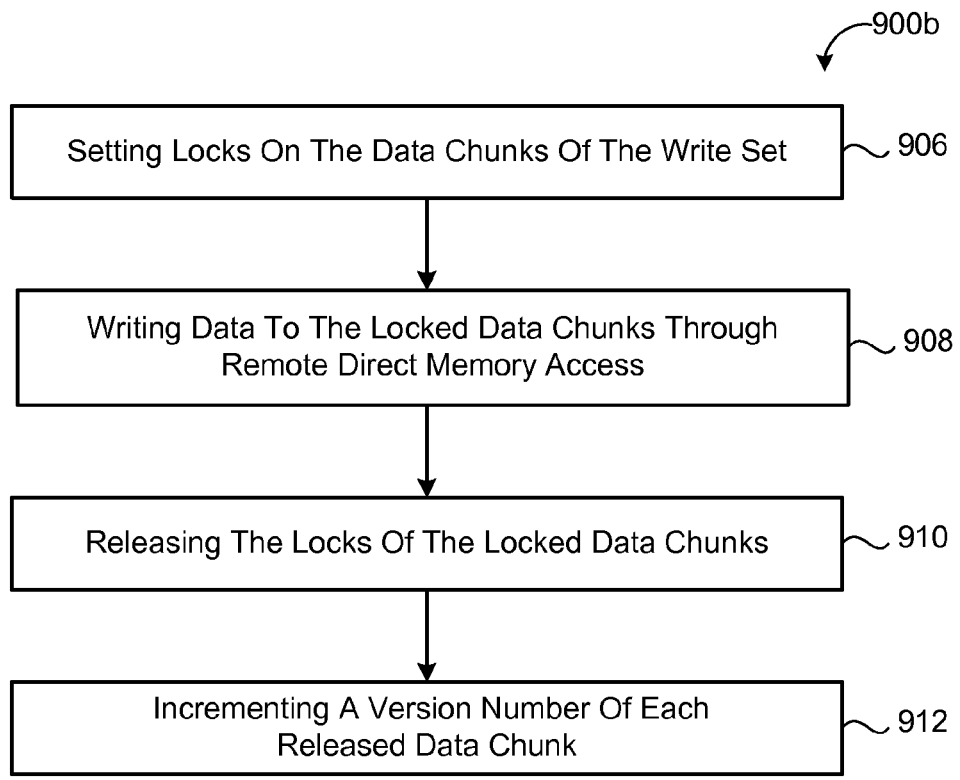

FIGS. 9A and 9B provide exemplary arrangements 900a, 900b of operations for a method executing a transaction 420a in a distributed storage system 100. With additional reference to FIG. 4D, for data chunks 320$n_k$ of a read set 402 of the transaction 420a, the method includes reading 902 data 312 of the data chunks 320$n_k$ of the read set 402 through remote direct memory access and determining 904 a validity of the read data 312 by evaluating a lock 316 and a version 318 of each data chunk 320$n_k$ of the read set 402. For data chunks 320$n_k$ of a write set 404 of the transaction 420a, the method includes setting 906 locks 316 on the data chunks 320$n_k$ of the write set 404, writing 908 data 312 to the locked data chunks 320$n_k$ through remote direct memory access, releasing 910 the locks 316 of the locked data chunks 320$n_k$, and incrementing 912 a version number 318 of each released data chunk 320$n_k$.

In some implementations, the method includes aborting the transaction 420a when at least one data chunk 320$n_k$ of the write set fails to receive a lock or when the read data 312 is invalid. For any data chunks 320$n_k$ having an unreleased lock 316, the method may include resetting (e.g., via the curator 210) those data chunks 320$n_k$ to an uninitialized state and releasing their locks 316. The method may include rereading the data 312 of the data chunks 320$n_k$ of the read set 402 when the previous read is invalid. In some examples, the method includes reading existing data 312 of the data chunks 320$n_k$ of the write set 404 before writing new data 312 to those data chunks 320$n_k$, and writing the existing data 312 of the data chunks 320$n_k$ of the write set 404 to a durable intent log 406 to allow later reconstruction of the data 312 if the write operation fails, so as to provide a durable transaction 420a.

The method may include aborting the transaction 420a when at least one data chunk $320n_k$ of the write set 404 fails to receive a lock 316 or when the read data 312 is invalid. For any data chunks $320n_k$ having an unreleased lock 316, the method may include marking the data 312 as uninitialized and releasing the lock 316 for non-durable transactions 420a or retrieving their existing data 312 stored in the durable intent log 406, writing the retrieved data 312 to the corresponding data chunks $320n_k$ to reconstruct the data 312, and the releasing the locks 316 of those data chunks $320n_k$ to provide a durable transaction 420a.

The method may include reading an initial version number 318a and an initial lock value 316a associated with each data chunk $320n_k$ of the read set 402. After reading the data 312, the method includes reading a final version number 318b and a final lock value 316b associated with each data chunk $320n_k$ of the read set 402 and determining the read data as valid when the initial version number 318a matches the final version number 318b and the initial lock value 316a matches the final lock value 316b. Setting locks on the data chunks $320n_k$ of the write set 404 may include, for each data chunk $320n_k$, retrieving a lock word 316 associated with the data chunk $320n_k$, comparing data of the lock word 316 with compare data, and writing swap data (e.g., a unique client identifier) to the lock word 316 when the lock word data and the compare data match. The method may include accessing metadata 324, 328 associated with each data chunk $320n_k$ that includes a version number 318 and a lock word 316 containing a lock value.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks;

and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A distributed storage system comprising:
    a curator managing striping of data across non-transitory memory by:
        dividing a file into data stripes and replicating the data stripes into data chunks;
        allocating storage of the data stripes and data chunks in the non-transitory memory; and
    memory hosts in communication with the curator, each memory host comprising:
        a set of remote direct memory accessible regions of the non-transitory memory allocated by the curator, the memory regions storing data chunks of files, each data chunk associated with one or more clients in an access control list, the access control list provides an access permission for each associated client of each associated data chunk;
        a network interface controller in communication with the memory and servicing remote direct memory access requests; and
        a computing processor in communication with the memory and the network interface controller, the computing processor executing a host process that registers the set of remote direct memory accessible regions of the memory with the network interface controller;
        wherein in response to receiving a connection request from a client process of a client in communication with curator and the memory host to access a data chunk, the host process establishes a remote direct memory access capable connection with the client process when the client is associated with the data chunk in the access control list, the host process associating the established connection with a protection domain having associated memory regions; and
        wherein in response to a notification from the client indicating that the data chunk stored on one of the memory regions is corrupt during the established connection between the client process and the host process, the curator attempting to reconstruct the corrupt data chunk, or if the curator is unable to reconstruct the corrupt data chunk, the curator replacing the corrupt data chunk with a new uninitialized data chunk.

2. The distributed storage system of claim 1, wherein the connection is capable of accessing only the memory regions associated with its protection domain.

3. The distributed storage system of claim 1, wherein the network interface controller of the memory host executes a connection handshake with a network interface controller of the client process to establish the remote direct memory access capable connection between the host process and the client process.

4. The distributed storage system of claim 3, the connection handshake evaluates an identity of the host and client processes.

5. The distributed storage system of claim 1, wherein the client process and host process can each unilaterally break the connection therebetween.

6. The distributed storage system of claim 1, wherein the host process registers the remote direct memory accessible regions of memory with a permission of read-only or read/write.

7. The distributed storage system of claim 1, wherein the network interface controllers tear down the connection when the remote direct memory access request includes an address for unregistered memory.

8. The distributed storage system of claim 1, wherein the curator associates each data chunk with a protection domain, the protection domain capable of being associated with one or more connections.

9. The distributed storage system of claim 8, wherein in response to a memory access request from a client in communication with the memory hosts and the curator, the curator returns a file descriptor to the client that maps data chunks of a file on the memory hosts for remote direct memory access of the data chunks on the memory hosts.

10. The distributed storage system of claim 9, wherein the file descriptor comprises a client key for each data chunk of the file, each client key allowing access to the corresponding data chunk on its memory host.

11. The distributed storage system of claim 10, wherein the network interface controller of each memory host creates a client key for each registered memory region.

12. A method of controlling access in a distributed storage system, the method comprising:
  receiving a connection request from a client to access one or more data chunks of a file stored in non-transitory memory of a memory host, the memory host in communication with a curator that manages striping of data across the memory host by:
    dividing the file into data stripes and replicating the data stripes into data chunks; and
    allocating storage of the data stripes and data chunks in the non-transitory memory; and
  establishing a remote direct memory access capable connection with the client when the client is associated with the data chunk in an access control list, the client in communication with the curator and the memory host, the access control list providing an access permission for each associated client of each associated data chunk;
  wherein in response to a notification from the client indicating that the data chunk stored in the non-transitory memory is corrupt during the established connection, the curator attempting to reconstruct the corrupt data chunk, or if the curator is unable to reconstruct the corrupt data chunk, the curator replacing the corrupt data chunk with a new uninitialized data chunk.

13. The method of claim 12, further comprising associating the established connection with a protection domain having an associated memory region storing the data chunk, the connection capable of accessing only memory regions associated with its protection domain.

14. The method of claim 13, wherein the protection domain is capable of being associated with one or more connections.

15. The method of claim 13, further comprising associating the data chunk with the protection domain.

16. The method of claim 12, further comprising executing a connection handshake with the client to establish the remote direct memory access capable connection.

17. The method of claim 16, further comprising evaluating an identity of the client.

18. The method of claim 12, further comprising registering remote direct memory accessible regions of memory with a network interface controller of the memory host.

19. The method of claim 12, further comprising registering the remote direct memory accessible regions of memory with a permission of read-only or read/write.

20. The method of claim 12, further comprising allocating memory for the data chunk and associating the data chunk with the access control list.

21. The method of claim 12, further comprising assigning an access permission for each client associated with the data chunk in the access control list.

22. The method of claim 12, further comprising tearing down the connection when a received remote direct memory access request includes an address for unregistered memory.

23. The method of claim 12, further comprising, in response to a memory access request from the client, returning a file descriptor that maps data chunks of the file on memory hosts for remote direct memory access of the data chunks on the memory hosts.

24. The method of claim 23, wherein the file descriptor comprises a client key for each data chunk of the file, each client key allowing access to the corresponding data chunk on its memory host.

25. A method of accessing data stored on a distributed storage system, the method comprising:
  instantiating a memory access request from a client to access a data chunk of a file stored in non-transitory memory of a memory host of the distributed storage system, the client in communication with a curator that manages striping of data across the memory host by:
    dividing the file into data stripes and replicating the data stripes into data chunks; and
    allocating storage of the data stripes and data chunks in the non-transitory memory;
  searching a connection cache for an open remote direct memory access capable connection to the memory host that is associated with a protection domain of the data chunk associated with the memory access request;
  if the connection cache fails to contain the open connection, sending a connection request to the memory host, the memory host establishing the remote direct memory access capable connection when a requestor of the connection request is associated with the data chunk in an access control list, the access control list providing an access permission for the client associated with the data chunk; and
  sending the memory access request to the memory host over the open connection;
  wherein in response to a notification from the client indicating that the data chunk associated with the memory access request and stored within the non-transitory memory is corrupt during the established connection with the memory host, the curator attempting to reconstruct the corrupt data chunk, or if the curator is unable to reconstruct the corrupt data chunk, the curator replacing the corrupt data chunk with a new uninitialized data chunk.

26. The method of claim 25, further comprising receiving a file descriptor mapping the data chunk to the memory hosts.

27. The method of claim 26, wherein the file descriptor comprises a client key allowing access to the corresponding data chunk on its memory host.

28. The method of claim 25, further comprising including the access control list in the connection request.

29. The method of claim 25, further comprising storing the open connection in a connection cache.

30. The method of claim 25, further comprising executing a connection handshake with a network interface controller of the memory host to establish the remote direct memory access capable connection.

31. The method of claim 25, further comprising sending a memory access request for multiple data chunks stored in the memory of the memory host, two or more of the data chunks associated with different access control lists.

* * * * *